US012803958B2

(12) United States Patent
Lashgari et al.

(10) Patent No.: US 12,803,958 B2
(45) Date of Patent: Nov. 17, 2026

(54) FILTER CHAIN WITHIN A GATEWAY TENANCY FOR SOFTWARE ASSURANCE IN A CLOUD ENVIRONMENT

(71) Applicant: Oracle International Corporation, Redwood Shores, CA (US)

(72) Inventors: Kourosh Lashgari, Seattle, WA (US); Pushkar Narendra Ladhe, Seattle, WA (US)

(73) Assignee: Oracle International Corporation, Redwood Shores, CA (US)

(*) Notice: Subject to any disclaimer, the term of this patent is extended or adjusted under 35 U.S.C. 154(b) by 85 days.

(21) Appl. No.: 19/017,030

(22) Filed: Jan. 10, 2025

(65) Prior Publication Data

US 2026/0205439 A1 Jul. 16, 2026

(51) Int. Cl.

| | |
|---|---|
| ***H04L 9/40*** | (2022.01) |
| ***H04L 12/66*** | (2006.01) |
| ***H04L 67/10*** | (2022.01) |
| ***H04L 69/329*** | (2022.01) |

(52) U.S. Cl.

CPC .......... *H04L 63/0245* (2013.01); *H04L 12/66* (2013.01); *H04L 67/10* (2013.01); *H04L 69/329* (2013.01)

(58) Field of Classification Search

CPC ..... H04L 63/0245; H04L 12/66; H04L 67/10; H04L 69/329; H04L 67/1012; H04L 61/106; H04L 63/20; H04L 63/0227

See application file for complete search history.

(56) References Cited

U.S. PATENT DOCUMENTS 8,695,059 B2 * 4/2014 Kopti ...................... G06F 21/56 726/4
10,044,757 B2 * 8/2018 Qureshi .................. H04W 4/02
10,931,747 B2 * 2/2021 Bothello ............. H04L 67/1042
11,134,104 B2 * 9/2021 Qureshi .............. H04L 63/0471
11,936,664 B2 * 3/2024 Numainville ....... H04L 63/0815
12,010,099 B1 * 6/2024 Salas Lumbreras ......................... H04L 63/0272
12,218,779 B2 * 2/2025 Sundararajan .......... H04L 12/46

(Continued)

OTHER PUBLICATIONS

U.S. Appl. No. 18/823,339, entitled "Traffic Aware Policy Engine", filed Sep. 3, 2024.

(Continued)

*Primary Examiner* — Hosuk Song
(74) *Attorney, Agent, or Firm* — Mughal Gaudry & Franklin PC

(57) ABSTRACT

Techniques for implementing a filter service for software assurance within a cloud environment are disclosed. At the filter service, a plurality of requests is received from a gateway service operating within a gateway tenancy of a cloud environment. Each request of the plurality of requests is either inbound to a customer tenancy or outbound from the customer tenancy of the cloud environment. Each request is processed by the filter service, by one or more of (i) validating a schema of one or more requests of the plurality of requests, (ii) sampling one or more requests of the plurality of requests, and (iii) auditing one or more requests of the plurality of requests. A first request of the plurality of requests is allowed passage to a corresponding target destination, and a second request of the plurality of requests is denied to a corresponding target destination.

20 Claims, 18 Drawing Sheets

(56) References Cited

U.S. PATENT DOCUMENTS

| | | | | |
|---|---|---|---|---|
| 12,556,517 | B2 * | 2/2026 | Brown | H04L 63/029 |
| 12,563,017 | B2 * | 2/2026 | Salas Lumbreras | H04L 63/0263 |
| 2022/0303216 | A1 * | 9/2022 | Xiong | G06F 9/547 |

OTHER PUBLICATIONS

U.S. Appl. No. 18/882,431, entitled "Packet Level Data Centric Protection Enforcement", filed Sep. 11, 2024.

* cited by examiner

FILTER CHAIN WITHIN A GATEWAY TENANCY FOR SOFTWARE ASSURANCE IN A CLOUD ENVIRONMENT

BACKGROUND

A cloud provider provides on-demand, scalable computing resources (e.g., a cloud environment) to its cloud customers. A cloud customer generally desires to run its cloud resources without monitoring, scanning, or other interference by the cloud provider or other cloud customer. Therefore, the cloud provider offers "tenancies" to its cloud customers. A tenancy is an isolated partition within the cloud environment, such that resources in different tenancies are isolated from each other unless explicitly shared. Each tenancy runs a plurality of virtual machine compute instances.

BRIEF SUMMARY

In various embodiments, a non-transitory computer-readable medium includes instructions that when executed by one or more processors, cause the one or more processors to perform operations including: receiving, at a gateway tenancy of a cloud environment, a plurality of packets from a compute instance operating within a customer tenancy of the cloud environment, wherein (i) a first subset of the plurality of packets are destined for an Internet Protocol (IP) address that is accessible to the gateway tenancy over a public network, the first subset of the plurality of packets being part of a first request from the compute instance, and (ii) a second subset of the plurality of packets are destined for a cloud resource operating within the cloud environment, the second subset of the plurality of packets being part of a second request from the compute instance; processing, at the gateway tenancy and at an application layer (Layer 7), the first subset of the plurality of packets; processing, at the gateway tenancy and at the application layer (Layer 7), the second subset of the plurality of packets; transmitting, from the gateway tenancy, the first subset of the plurality of packets to the IP address over the public network; and denying passage of the second subset of the plurality of packets to the cloud resource. In an example, processing the first subset of the plurality of packets comprises (i) analyzing, at the application layer, the first request comprising the first subset of the plurality of packets, and (ii) failing to detect any anomalous issue with the first request; and transmitting the first subset of the plurality of packets to the IP address comprises: in response to failing to detect any anomalous issue with the first request, transmitting the first subset of the plurality of packets to the IP address.

In an example, processing the second subset of the plurality of packets comprises (i) analyzing, at the application layer, the second request comprising the second subset of the plurality of packets, and (ii) detecting an anomalous issue with the second request; and denying passage of the second subset of the plurality of packets to the cloud resource comprises: in response to detecting the anomalous issue with the second request, denying passage of the second subset of the plurality of packets to the cloud resource. In an example, the compute instance is a first compute instance; the customer tenancy is a first customer tenancy operating within a first cloud region of the cloud environment; the compute instance operates within a first virtual cloud network (VCN) of the first customer tenancy of the cloud environment; the cloud resource operating within the cloud environment is a second compute instance operating within a second VCN; and the second VCN operates within the first cloud region of the cloud environment. In an example, the compute instance is a first compute instance; the customer tenancy is a first customer tenancy operating within a first cloud region of the cloud environment; the compute instance operates within a first virtual cloud network (VCN) of the first customer tenancy of the cloud environment; the cloud resource operating within the cloud environment is a second compute instance operating within a second VCN; and the second VCN operates within a second cloud region of the cloud environment that is different from the first cloud region of the cloud environment. In an example, the cloud resource operating within the cloud environment is a cloud service provided by a provider of the cloud environment.

In an example, the operations further include: establishing an endpoint within the gateway tenancy, wherein the first subset of the plurality of packets and the second subset of the plurality of packets are received (i) from the compute instance, (ii) at the endpoint within the gateway tenancy, and (iii) as network layer (Layer 3) or transport layer (Layer 4) packets; and transforming the first subset of the plurality of packets to the first request at the application layer, and transforming the second subset of the plurality of packets to the second request at the application layer. In an example, the plurality of packets is a first plurality of packets, wherein the cloud resource is a first cloud resource, wherein the IP address is a first IP address, and wherein the operations further include: receiving, at a first endpoint within the gateway tenancy of the cloud environment, a second plurality of packets from a second cloud resource, the second plurality of packets being part of a third request that is destined for the compute instance; receiving, at a second endpoint within the gateway tenancy of the cloud environment, a third plurality of packets from a second IP address, the third plurality of packets being part of a fourth request that is destined for the compute instance; and processing, at the gateway tenancy and at the application layer, the second plurality of packets and the third plurality of packets. In an example, the operations further include: selectively transmitting or denying passage of the second plurality of packets to the compute instance, based at least in part on processing, at the application layer, the second plurality of packets; and selectively transmitting or denying passage of the third plurality of packets to the compute instance, based at least in part on processing, at the application layer, the third plurality of packets. In an example, processing, at the gateway tenancy and at the application layer, the second plurality of packets comprises detecting an anomalous issue associated with one or more packets of the second plurality of packets; and selectively transmitting or denying passage of the second plurality of packets to the compute instance comprises: modifying the one or more packets of the second plurality of packets, prior to transmitting the second plurality of packets to the compute instance, based at least in part on detecting the anomalous issue associated with the one or more packets of the second plurality of packets.

In an example, processing, at the gateway tenancy and at an application layer (Layer 7), the first subset of the plurality of packets comprises: analyzing, at the application layer, the first request that is in accordance with one of the following application layer protocols: Transmission Control Protocol (TCP), Hyper Text Transfer Protocol (HTTP), Hypertext Transfer Protocol Secure (HTTPS), gRPC Remote Procedure Calls (gRPC), Websocket, GraphQL, Thrift interface definition language (IDL), Simple Mail Transfer Protocol (SMTP), or Secure Shell (SSH). In an example, the customer tenancy and the gateway tenancy are two separate tenancies of the cloud environment. In an example, all packets inbound towards the customer tenancy and outbound from the customer tenancy are intercepted and processed by the gateway tenancy. In an example, the gateway tenancy maintains software assurance of the customer tenancy.

In various embodiments, a method comprises: receiving, at a gateway tenancy of a cloud environment, a plurality of packets from a compute instance operating within a customer tenancy of the cloud environment, wherein (i) a first subset of the plurality of packets are destined for an Internet Protocol (IP) address that is accessible to the gateway tenancy over a public network, the first subset of the plurality of packets being part of a first request from the compute instance, and (ii) a second subset of the plurality of packets are destined for a cloud resource operating within the cloud environment, the second subset of the plurality of packets being part of a second request from the compute instance; processing, at the gateway tenancy and at an application layer (Layer 7), the first subset of the plurality of packets; processing, at the gateway tenancy and at the application layer (Layer 7), the second subset of the plurality of packets; denying passage of the first subset of the plurality of packets to the IP address; and transmitting, from the gateway tenancy, the second subset of the plurality of packets to the cloud resource. In an example, the compute instance is a first compute instance; the customer tenancy is a first customer tenancy operating within a first cloud region of the cloud environment; the compute instance operates within a first virtual cloud network (VCN) of the first customer tenancy of the cloud environment; the cloud resource operating within the cloud environment is a second compute instance operating within a second VCN; and the second VCN operates within one of (i) the first cloud region of the cloud environment, or (ii) a second cloud region of the cloud environment that is different from the first cloud region of the cloud environment. In an example, the cloud resource operating within the cloud environment is a cloud service provided by a provider of the cloud environment. In an example, the method further comprises: establishing an endpoint within the gateway tenancy, wherein the first subset of the plurality of packets and the second subset of the plurality of packets are received (i) from the compute instance, (ii) at the endpoint within the gateway tenancy, and (iii) as network layer (Layer 3) or transport layer (Layer 4) packets; and transforming the first subset of the plurality of packets to the first request at the application layer, and transforming the second subset of the plurality of packets to the second request at the application layer.

In various embodiments, a system comprises: one or more processors; and one or more non-transitory computer-readable media storing instructions, which, when executed by the system, cause the system to perform a set of actions including: receiving, at a first endpoint within a gateway tenancy of a cloud environment, a first plurality of packets from a cloud resource, the first plurality of packets being part of a first request that is destined for a compute instance operating within a customer tenancy of the cloud environment; receiving, at a second endpoint within the gateway tenancy of the cloud environment, a second plurality of packets from an Internet Protocol (IP) address, the second plurality of packets being part of a second request that is destined for the compute instance; processing, at the gateway tenancy and at an application layer, the first plurality of packets and the second plurality of packets; selectively transmitting or denying passage of the first plurality of packets to the compute instance, based at least in part on processing, at the application layer, the first plurality of packets; and selectively transmitting or denying passage of the second plurality of packets to the compute instance, based at least in part on processing, at the application layer, the second plurality of packets. In an example, all packets inbound towards the customer tenancy and outbound from the customer tenancy are intercepted and processed by the gateway tenancy.

In various embodiments, a non-transitory computer-readable medium includes instructions that when executed by one or more processors, cause the one or more processors to perform operations including receiving, at a filter service, a plurality of requests from a gateway service operating within a gateway tenancy of a cloud environment, wherein each request of the plurality of requests is either inbound to a customer tenancy or outbound from the customer tenancy of the cloud environment; processing, by the filter service, each request of the plurality of requests, wherein processing the plurality of requests comprises one or more of (i) validating a schema of one or more requests of the plurality of requests, (ii) sampling one or more requests of the plurality of requests, and (iii) auditing one or more requests of the plurality of requests; and based at least in part on processing each request of the plurality of requests, (i) allowing passage of a first request of the plurality of requests to a corresponding target destination, and (ii) denying passage of a second request of the plurality of requests to a corresponding target destination. In an example, the operations further include: based at least in part on processing each request of the plurality of requests, (i) modifying a third request of the plurality of requests, and (ii) allowing passage of the modified third request of the plurality of requests to a corresponding target destination. In an example, modifying the third request of the plurality of requests comprises: based at least in part on processing the third request of the plurality of requests, detecting an anomalous issue with the third request; and modifying the third request of the plurality of requests, to resolve the anomalous issue with the third request. In an example, modifying the third request of the plurality of requests comprises: identifying a section of the third request that is causing the anomalous issue; and modifying the third request, by removing or redacting at least the section of the third request.

In an example, denying passage of the second request of the plurality of requests to the corresponding target destination comprises: based at least in part on processing each request of the plurality of requests, detecting an anomalous issue with the second request: and based at least in part on detecting the anomalous issue with the second request, denying passage of the second request of the plurality of requests to the corresponding target destination. In an example, allowing passage of the first request of the plurality of requests to the corresponding target destination comprises: based at least in part on processing each request of the plurality of requests, failing to detect any anomalous issue with the first request: and based at least in part on failing to detect any anomalous issue with the first request, allowing passage of the first request of the plurality of requests to the corresponding target destination. In an example, validating the schema of one or more requests of the plurality of requests comprises: verifying that a request adheres to predefined data structures and data formats. In an example, validating the schema of one or more requests of the plurality of requests comprises: determining that the second request does not adhere to the predefined data structures and data formats, wherein passage of the second request to the corresponding target destination is denied, based at least in part on determining that the second request does not adhere to predefined data structures and data formats.

In an example, sampling one or more requests of the plurality of requests comprises: randomly or pseudo-randomly selecting a subset of the plurality of requests; and storing the selected subset of the plurality of requests for offline analysis and anomaly detection. In an example, auditing one or more requests of the plurality of requests comprises: for at least one request of the plurality of requests, storing one or more of metadata associated with the least one request, an origin and destination of the least one request, a network path taken by the least one request, a timestamp of the least one request, one or more protocols associated with the least one request, and a status of schema validation of the least one request. In an example, the plurality of requests is a first plurality of requests; the first plurality of requests is received from a compute instance within the customer tenancy and is destined for a first resource within or outside the cloud environment; the filter service is a first filter service; and the operations further include: receiving, at a second filter service operating within the gateway tenancy of the cloud environment, a second plurality of requests from the gateway service operating within the gateway tenancy, wherein each request of the second plurality of requests is outbound from the compute instance within the customer tenancy and is destined for a second resource within or outside the cloud environment; processing, by the second filter service, each request of the second plurality of requests, wherein processing the second plurality of requests comprises one or more of (i) validating a schema of one or more requests of the second plurality of requests, (ii) sampling one or more requests of the second plurality of requests, and (iii) auditing one or more requests of the second plurality of requests; and based at least in part on processing each request of the second plurality of requests, (i) allowing passage of a third request of the second plurality of requests, without modifying the third request, to the second cloud resource, (ii) denying passage of a fourth request of the second plurality of requests to the second cloud resource, and (iii) modifying a fifth request of the second plurality of requests, and allowing passage of the modified fifth request of the second plurality of requests to the second cloud resource. In an example, a first schema validation implemented by the first filter service is different from a second schema validation implemented by the second filter service, such that a first data filed allowed under the first schema validation is disallowed under the second schema validation.

In an example, each request of the plurality of requests is received from the gateway service at a transport layer (layer 4). In an example, each request of the plurality of requests is received from the gateway service at an application layer (layer 7) of a protocol stack. In an example, any user or administrator of the customer tenancy does not have privilege to configure settings of the filter service. In an example, processing, by the filter service, each request of the plurality of requests comprises: classifying and labelling a request of the plurality of requests, by adding metadata to the request, the metadata including a classification and/or a label of the request; and utilizing the metadata in further processing the request.

In various embodiments, a method comprises: receiving, at a filter service, a plurality of requests from a gateway service operating within a gateway tenancy of a cloud environment, wherein each request of the plurality of requests is either inbound to a customer tenancy or outbound from the customer tenancy of the cloud environment; processing, by the filter service, each request of the plurality of requests, wherein processing the plurality of requests comprises one or more of (i) validating a schema of one or more requests of the plurality of requests, (ii) sampling one or more requests of the plurality of requests, and (iii) auditing one or more requests of the plurality of requests; and based at least in part on processing each request of the plurality of requests, (i) allowing passage of a first request of the plurality of requests to a corresponding target destination, and (ii) denying passage of a second request of the plurality of requests to a corresponding target destination. In an example, each request of the plurality of requests is received from the gateway service at an application layer (layer 7) of a protocol stack.

In various embodiments, a system comprises: one or more processors; and one or more non-transitory computer-readable media storing instructions, which, when executed by the system, cause the system to perform a set of actions including: receiving, at a filter service, a plurality of requests from a gateway service operating within a gateway tenancy of a cloud environment, wherein each request of the plurality of requests is either inbound to a customer tenancy or outbound from the customer tenancy of the cloud environment; processing, by the filter service, each request of the plurality of requests, wherein processing the plurality of requests comprises one or more of (i) validating a schema of one or more requests of the plurality of requests, (ii) sampling one or more requests of the plurality of requests, and (iii) auditing one or more requests of the plurality of requests; and based at least in part on processing each request of the plurality of requests, (i) allowing passage of a first request of the plurality of requests to a corresponding target destination, and (ii) denying passage of a second request of the plurality of requests to a corresponding target destination. In an example, wherein the actions further include: based at least in part on processing each request of the plurality of requests, (i) modifying a third request of the plurality of requests, and (ii) allowing passage of the modified third request of the plurality of requests to a corresponding target destination.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

Various embodiments are described hereinafter with reference to the figures. It should be noted that the figures are not drawn to scale and that the elements of similar structures or functions are represented by like reference numerals throughout the figures. It should also be noted that the figures are only intended to facilitate the description of the embodiments. They are not intended as an exhaustive description of the disclosure or as a limitation on the scope of the disclosure.

DETAILED DESCRIPTION

Figure 1:
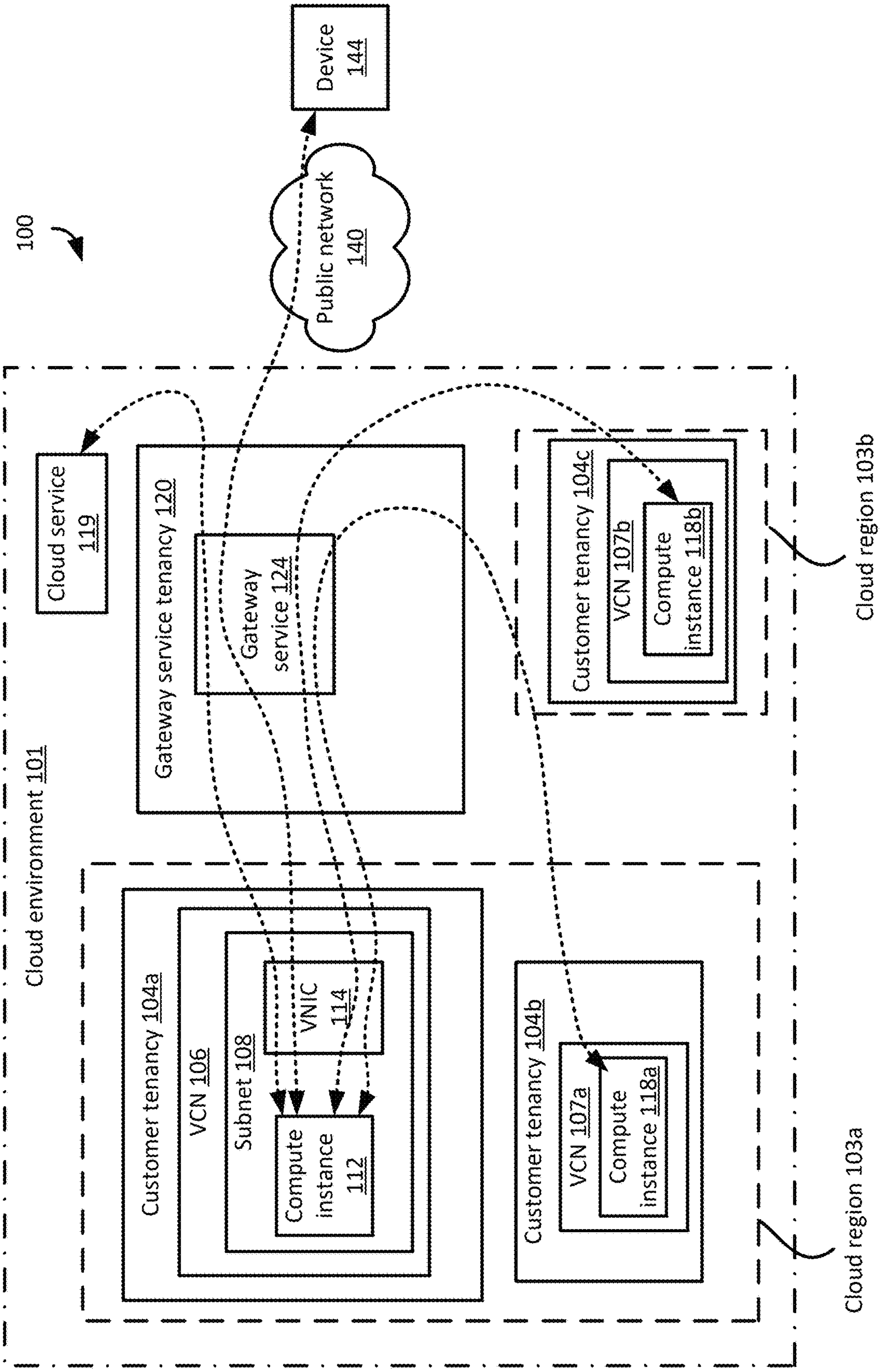
FIG. 1 illustrates a block diagram of a system including a cloud environment, wherein the cloud environment comprises a gateway service tenancy executing a generic gateway service.

Maintaining security of a cloud environment involves controlling access to cloud resources based on permissions specified by respective cloud customers. A cloud customer can grant permissions for accessing cloud resources that it rents, but the cloud customer should not be able to grant permissions for accessing cloud resources rented by other customers. A tenancy is a conceptual bucket that holds cloud resources belonging to a particular cloud customer. An administrator of a tenancy has administrative rights to set access policies for cloud resources in the tenancy; an administrator of a tenancy does not have administrative rights to set access policies for cloud resources in another tenancy. A tenancy of a cloud customer is isolated from another tenancy of another cloud customer. A tenancy of a cloud customer includes a plurality of active cloud resources, such as compute instances that are used to host virtual machines. The cloud provider may also have control on one or more tenancies (e.g., cloud provider tenancies), through which the cloud provider may provide one or more services to the cloud customers. Such a tenancy is also referred to as a service tenancy.

In a typical scenario, a cloud customer renting a customer tenancy within a cloud environment may use cloud resources within the customer tenancy, independent of any major oversight from a provider of the cloud environment or any third-party oversight. For example, the cloud customer can ingress and/or egress data from and/or to the customer tenancy, with minimal or no oversight from the provider of the cloud environment or from another third party. However, in the context of software assurance described herein, an additional role of an assurance administrator is added into the picture. The assurance administrator may or may not be the same as the cloud provider. In an example, the assurance administrator acts as a "trusted technology provider" (TTP). With regard to the subject disclosure, in an example, the assurance administrator has a monitoring role over a manner in which the cloud customer is using cloud resources within the customer tenancy. Merely as an example, the assurance administrator may want to at least in part monitor traffic going to, or coming out of the customer tenancy. For example, the assurance administrator may want to at least in part monitor ingress and/or egress traffic of the customer tenancy. For example, the assurance administrator may want to ensure that the cloud customer is compliant with guidelines mutually agreed between the cloud customer and the assurance administrator, although other example monitoring use cases (such as reasons behind such monitoring) may also be possible. In an example, the assurance administrator may be tasked by a government regulatory agency to monitor the customer tenancy, e.g., to ensure that the customer tenancy adheres to regulatory guidelines established by the government regulatory agency. In another example, the customer tenancy may deal with high security and/or sensitive information, such as when the customer tenancy is rented out to a financial institution or a health care organization (where privacy of confidential patient record is important), and in such cases, the cloud customer and/or a regulatory authority may appoint the assurance administrator to monitor ingress and/or egress traffic of the customer tenancy.

In an example, there may be a lack of trust between the assurance administrator and an operator of the customer tenancy. Accordingly, the assurance administrator may have zero trust on ingress traffic and/or egress traffic of the customer tenancy. For example, as a part of such software assurance, the assurance administrator may want to review and analyze traffic routed to and/or from the customer tenancy. Anomalies or issues detected during such review and analysis process may be reported back to the assurance administrator. For example, detected anomalies or issues may result in corrective action, such as redaction or removal of the detected anomalies. Additionally or alternatively, in another example, reporting actions may be undertaken, such as reporting the anomalies to a reporting authority. In an example, if the anomalies or issues indicate security risks, the assurance administrator may take corrective actions, such as removal or redaction of the anomalies or issues, denial of passage of the traffic to its target destination, and/or may report the anomalies or issues to a higher reporting authority (such as the government regulatory agency). If no anomalies are detected within a plurality of data packets, the data packets are allowed passage to their intended destination. Software assurance actions taken by the assurance administrator may be implementation specific, and may vary from one implementation to the next. In an example, actions undertaken upon detecting anomalous issues may be implementation specific, and also described below.

In a typical scenario, the provider of the cloud environment may provide a plurality of gateways for ingress and/or egress traffic from a customer tenancy. For example, the cloud environment may offer a local peering gateway (LPG), a remote peering gateway (RPG), an internet gateway (IGW), a network address translation (NAT) gateway, a service gateway (SWG), a dynamic routing gateway (DRG) gateway, and/or other gateways for incoming and/or outgoing traffic of the customer tenancy, as described below in further detail. In an example, each such gateway may offer different set of functionalities. However, in an example, operating such a plethora of gateways and/or ensuring software assurance compliance within each such gateway may pose various challenges.

Accordingly, techniques are described herein by which, instead of such a plurality of gateways, the cloud environment provides a single, unified, and generic gateway service for handling communication to and/or from a customer tenancy. The gateway service operates within a gateway tenancy. Traffic to and/or from the customer tenancy is routed through the gateway service of the gateway tenancy. The gateway service acts as a standalone bridge between compute instances within the customer tenancy and any other resources that are within or external to the cloud environment. Thus, the generic gateway service eliminates the need of a plurality of gateways for a plurality of types of traffic to and/or from the customer tenancy, as will be described below in further detail.

For example, assume a compute instance operating within a virtual cloud network (VCN) of the customer tenancy (where VCNs, subnets within a VCN, and compute instances within a subnet are described below in further detail). The compute instance operating within a first VCN of the customer tenancy may communicate, through the unified gateway service, with private and/or public Internet Protocol (IP) addresses that are within or outside the cloud environment, with compute instances of one or more other VCNs (e.g., which may be within the same cloud region as the first VCN, or within a different cloud region), cloud services offered by the provider of the cloud environment, etc. Thus, the generic and unified gateway service replaces a plurality of gateway services generally used for each such type of communication.

Also described below are endpoints, which are cloud resources created within the gateway service. The endpoints (such as ingress and/or egress endpoints) within the gateway service facilitate operation of the gateway service, as well as prevent or at least reduce chances of unintended or unauthorized communication through the gateway service, as described below in further detail.

Also, to ensure software assurance, the gateway tenancy includes a plurality of filter services. For example, a filter service provides software assurance on traffic communicated through the gateway service to and/or from the customer tenancy.

In an example, it is assumed that "requests" are transmitted to and/or from the customer tenancy. Such a request may include any appropriate type of payload being transmitted to and/or from the customer tenancy. For example, the compute instance may transmit an API request to another resource through the gateway service, and the resource may transmit a corresponding API response back to the compute instance through the gateway service, and both such API request and API response are termed as "requests" being transmitted to and/or from the customer tenancy through the gateway service. Similarly, in another example, the compute instance may transmit a memory request to the compute instance through the gateway service, and the compute instance may transmit data from a memory to the compute instance through the gateway service, and both such memory request and the data are termed as "requests" being transmitted to and/or from the customer tenancy through the gateway service. Each request being transmitted to and/or from the customer tenancy comprises a plurality of data packets, which are transmitted through the gateway service.

In an example, the gateway service intercepts any incoming and/or outgoing request to and/or from the customer tenancy. The filter service described herein parses and analyzes each such request, to detect any possible anomaly with the request. If an anomaly is detected, the filter service undertakes corrective action (such as redact or remove the data causing the anomaly, report the anomaly to the assurance administrator, deny passage of the request to a target destination, and/or the like). On the other hand, if no anomaly is detected, the request is allowed passage to its intended destination.

As described below in further detail, the filter service includes a filter chain comprising a chain of plugins, such as a schema validation plugin, a sampling plugin, an audit plugin, a labelling and data classification plugin, and/or an action plugin. Such plugins of the filter chain ensure software assurance of the customer tenancy. For example, the plugins of the filter chain ensure that requests, which adheres to guidelines established or agreed upon by the assurance administrator, are allowed passage to and/or from the customer tenancy. On the other hand, requests, which do not adhere to guidelines established or agreed upon by the assurance administrator, are either denied passage to and/or from the customer tenancy, or are modified to assure adherence and then allowed passage to and/or from the customer tenancy, as described below in further detail.

In an example, to ensure that the filter service can properly analyze a request, the gateway service and the filter service operate at an application layer (or layer 7) of a protocol stack. For example, a plurality of data packets corresponding to a request (which may be transmitted to or from the customer tenancy) may be received at the gateway service as layer 3 or layer 4 packets. However, the filter service, instead of analyzing individual packets of the request, may want to analyze the request as a whole. Accordingly, the request is processed at layer 7 within the filter service. Thus, in an example, the gateway service and/or the filter service operate at layer 7, as described below in further detail.

FIG. 1 illustrates a block diagram of a system 100 including a cloud environment 101, wherein the cloud environment 101 comprises a gateway service tenancy 120 executing a generic gateway service 124.

A provider of the cloud environment 101 provides on-demand, scalable computing resources (a cloud environment) to its cloud customers. The cloud provider provides each cloud customer a "tenancy." A tenancy is an isolated partition within the cloud environment 101, such that resources in different tenancies are isolated from each other unless explicitly shared. A tenancy of a cloud customer is isolated from another tenancy of another cloud customer. Generally, an administrator of a tenancy has administrative rights to set access policies for cloud resources in the tenancy; an administrator of a tenancy does not have administrative rights to set access policies for cloud resources in another tenancy. For purposes of this disclosure and unless otherwise stated, a tenancy rented out to a customer of the cloud environment 101 is also referred to as a customer tenancy. For example, the cloud environment 101 includes customer tenancies 104*a*, 104*b*, 104*c* rented out to one or more cloud customers. The customer tenancies 104*a*, 104*b*, 104*c* may be rented out to different cloud customers, or may be rented out to a same cloud customer.

The customer tenancies 104*a*, 104*b*, 104*c* are made available by a cloud services provider (CSP, also referred to herein as a cloud provider, or a provider of the cloud environment 101), to users or customers on demand (e.g., via a subscription model). A customer may rent cloud services provided by the cloud provider, without having to purchase separate hardware and software resources for the services. Thus, the cloud environment 101 provides a customer (e.g., who is renting one or more customer tenancies) scalable access to applications and computing resources within the customer tenancies, without the customer having to invest in building or procuring such computing resources from scratch. A cloud provider may offer one or more types of cloud services to its customers using one or more types or models of cloud services, such as Software-as-a-Service (SaaS), Platform-as-a-Service (PaaS), Infrastructure-as-a-Service (IaaS), and/or the like. When a customer rents a service provided by the cloud environment 101, one or more corresponding customer tenancies (such as customer tenancies 104*a*, 104*b*, 104*c*) are created for the customer.

The cloud environment 101 includes one or more physical resources, such as host machines, memory resources, network resources (e.g., switches, routers, etc.), and/or one or more other resources present within a cloud environment, which is also referred to as a substrate network or an underlay network. In an example, virtualization software are executed by such physical resources, to provide a virtualized environment. This results in an overlay network or a virtual network over the substrate network. The physical resources provide the underlying basis for forming the overlay or virtual networks on top of a physical network. The substrate or underlay network includes physical resources. The overlay network is a logical or virtual network that executes on top of the substrate network. In an example, a physical network can support one or more overlay networks. A virtual network is implemented using software virtualization techniques, to run on top of the physical network.

In an example, each customer tenancy 104 includes one or more virtual cloud networks (VCNs). A VCN is a virtual, private network that somewhat resembles a traditional network, with firewall rules and specific types of communication gateways that can be configured. A VCN comprises a virtual or overlay network described above. For example, the customer tenancy 104*a* includes a VCN 106. Although the customer tenancy 104*a* may include more than one VCN, only one such VCN 106 is illustrated in FIG. 1. Similarly, each of the customer tenancies 104*b*, 104*c* includes corresponding one or more VCNs, such as VCNs 107*a* 107*b*, as illustrated in FIG. 1.

When a customer tenancy is rented out to a customer, the customer may configure one or more virtual networks within the customer tenancy, such as using compute resources, memory resources, and/or networking resources of the customer tenancy. One or more cloud resources or workloads, such as compute instances, may be spawned within these virtual networks. For example, a customer may configure one or more VCNs within the customer tenancy.

In an example, when a VCN is created within a customer tenancy, the VCN is associated with a private overlay classless inter-domain routing (CIDR) address space. The VCN is, thus, assigned a CIDR address space range comprising a plurality of private overlay IP addresses.

In an example, a VCN comprises one or more subnetworks, referred to as subnets. Each subnet is associated with a contiguous range of overlay IP addresses. IP addresses of a subset within a VCN do not overlap with IP addresses assigned to one or more other subnets within the VCN. The address spaces of all subsets within a VCN are representative of the address space of the VCN. Thus, a subnet comprises an address space subset of the range of IP addresses assigned to the VCN.

For example, in FIG. 1, the customer tenancy 104*a* includes the VCN 106, and the VCN 106 includes a subnet 108 (although the VCN 106 may include more than one subnet 108, only one such subnet is illustrated in FIG. 1). The subnets within the customer tenancies 104*b*, 104*c* are not illustrated in FIG. 1, for purposes of illustrative clarity.

In an example, each subnet includes a plurality of virtual cloud resources, such as compute instances, memory resources, network resources, etc. of the overlay virtual network. For example, FIG. 1 illustrates the subnet 108 including a compute instance 112. Similarly, the customer tenancies 104*b*, 104*c* include compute instances 118*a* and 118*b*, respectively (although subsets within the customer tenancies 104*b*, 104*c* are not illustrated in FIG. 1 for purposes of illustrative clarity).

In an example, a compute instance is associated with a virtual network interface card (VNIC). For example, the compute instance 112 is associated with the VNIC 114. VNICs of the compute instances 118*a*, 118*b* are not illustrated in FIG. 1.

In an example, a VNIC associated with a compute instance facilitates the compute instance to participate in a corresponding subnet that includes the compute instance. For example, the VNIC 114 associated with the compute instance 112 enables the compute instance 112 to participate in the subnet 108 of the VCN 106. A VNIC is a logical representation of a physical Network Interface Card (NIC). In an example, the VNIC forms an interface between a cloud resource (e.g., a compute instance, a service resource, or another cloud resource within a subset) and a corresponding virtual network. In an example, a VNIC is within a subnet of a VCN (such as the VNIC 114 within the subnet 108), and is assigned one or more IP addresses. In an example, the compute instance communicates with other endpoints of the cloud environment 101 through the corresponding VNIC. For example, through the VNIC, a compute instance may communicate with endpoints that are on the same subnet as the compute instance, with endpoints in different subnets in the same VCN as the subnet, or with endpoints outside the VCN. Thus, the VNIC associated with a compute instance facilitates communication of the compute instance with endpoints inside and outside the VCN.

For example, the VNIC 114 facilitates communication of the compute instance 112 with endpoints inside and outside the VCN 106. In an example, when a compute instance is created within a subnet of a VCN, an associated VNIC is also created and added to the corresponding subnet of the VCN. In an example, if a subnet includes a plurality of compute instances, the subnet may also include a corresponding plurality of VNICs, where each such VNIC is associated with a corresponding compute instance of the plurality of compute instance of the subnet.

As described above, a VNIC is assigned a private overlay IP address, which is the private overlay IP address assigned to the corresponding compute instance. In an example, the private overlay IP address assigned to the VNIC (and thus to the compute instance) is used to route traffic to and/or from the compute instance. For example, a subnet is assigned a contiguous range of overlay IP addresses, and an IP address from this range of overlay IP addresses is assigned to a corresponding VNIC (and the associated compute instance) within the subnet.

In an example, a subnet within a VCN can be configured as either a public subnet or a private subnet. Resources (e.g., compute instances) and associated VNICs in a private subnet may not have public overlay IP addresses. On the other hand, resources (e.g., compute instances) and associated VNICs in a public subnet may have public overlay IP addresses. In an example, if a subnet is a public subnet, a compute instance within the subnet may be assigned a public IP address (e.g., in addition to, or instead of the above-described overlay private IP address assigned to the compute instance). In an example, the subnet 108 of the VCN 106, and/or one or more other subnets of the customer tenancy 104*a* are private subnets, and are assigned private overlap IP addresses.

In an example, the cloud environment 101 includes a plurality of cloud regions, such as example cloud regions 103*a* and 103*b* illustrated in FIG. 1 (boundaries of cloud regions are illustrated using dashed lines in FIG. 1). Computing resources within each cloud region may be hosted in a corresponding geographical area. For example, the cloud region 103*a* may include physical resources and/or substrate network hosted in a first geographical area, and the cloud region 103*b* may include physical resources and/or substrate network hosted in a second geographical area. Thus, the cloud region 103*a* may be hosted in one or more data centers within the first geographical area, and the cloud region 103*b* may be hosted in one or more data centers within the second geographical area. Thus, the cloud environment 101 is organized in a plurality of cloud regions, examples of which include the cloud regions 103*a* and 103*b*. Cloud regions may be independent of each other, and possibly separated by vast geographical distances (e.g., in different countries, or in different regions or states of a country, or in different continents). For example, the customer tenancies 104*a* and 104*b* are illustrated to be within the same cloud region 103*a*, whereas the customer tenancy 104*c* is illustrated to be within another cloud region 103*b*, as illustrated in FIG. 1.

In an example, in addition to the customer tenancies, the cloud environment 101 includes one or more service tenancies, such as the service tenancy 120. The service tenancies are used to provide one or more services to one or more customer tenancies of the cloud environment 101. For example, the service tenancy 120 provides a gateway service to the customer tenancy 104*a*, and hence, is termed as a gateway service tenancy 120.

In a typical scenario (not for the cloud environment 101 of FIG. 1), the provider of the cloud environment 101 may provide a plurality of gateways for the VCN 106. For example, the cloud environment 101 may offer a local peering gateway (LPG) for VCN to VCN connectivity within a same cloud region, a remote peering gateway (RPG) for VCN to VCN cross region connectivity, an internet gateway (IGW) and/or a network address translation (NAT) gateway for internet outbound and inbound or bi-directional connectivity, a service gateway (SWG) for access to services provided by the cloud provider, a dynamic routing gateway (DRG) gateway for providing a path for private network traffic communication between a VCN and another endpoint outside the cloud region hosting the VCN 106, an API gateway for routing API calls, and/or one or more other gateways generally provided in a cloud environment. In an example, each such gateway may offer different set of functionalities. Operating such a plethora of gateways and/or ensuring assurance compliance within each such gateway (where gateway assurance is described below in further detail) may pose various challenges.

Accordingly, in an example, instead of such a plurality of gateways, the cloud environment 101 provides a single, unified, and generic gateway service 124 for the VCN 106 within the customer tenancy 104*a*. The gateway service 124 acts as a standalone bridge between compute instances within the customer tenancy 04*a* and any other zone (e.g., the Internet, VCNs, customer tenancies, compartments, cloud services, etc.) within the system 100.

For example, the gateway service 124 replaces a plurality of gateways that would otherwise have been associated within the VCN 106, such as a LPG, an RPG, an IGW, a NAT gateway, a SWG, a DRG, and/or one or more other gateways generally provided in a cloud environment. For example, the gateway service 124 provides networking functionalities that would otherwise have been provided by one or more of these gateways.

Routes between the compute instance 112 and one or more other resources within the system 100 are illustrated in dotted lines in FIG. 1. For example, the gateway service 124 routes data between the compute instance 112 and a cloud service 119 offered by the provider of the cloud environment 101. Thus, the gateway service 124 thus acts as a service gateway (SWG), routing traffic between a compute instance within a VCN and a cloud service offered by the provider of the cloud environment 101.

In another example, the gateway service 124 routes data between the compute instance 112 and a compute instance 118*a* within a VCN 107*a*, where the VCNs 106 and 107*a* are within a same cloud region 103*a*. Thus, in this example, the gateway service 124 facilitates establishment of a local peering network, and acts as a local peering gateway (LPG) for VCN-to-VCN connectivity within a same cloud region.

In yet another example, the gateway service 124 routes data between the compute instance 12 and a compute instance 118*b* within a VCN 107*b*, where the VCNs 106 and 107*a* are within different cloud regions 103*a*, 103*b*, respectively. Thus, in this example, the gateway service 124 provides a dynamic routing gateway (DRG) for private network traffic communication between the VCN 106 and another VCN 107*b* in a different cloud regions 103*a*, 103*b*, respectively, of the cloud environment 101.

In a further example, the gateway service 124 routes data between the compute instance 112 and a device 144 (or an IP address or a website) accessible to the VCN 106 over a public network 140 (such as the Internet). Thus, in this example, the gateway service 124 acts as an internet gateway (IGW) and/or network address translation (NAT) gateway for internet outbound and inbound or bi-directional connectivity to and/or from the compute instance 112.

Figure 2:
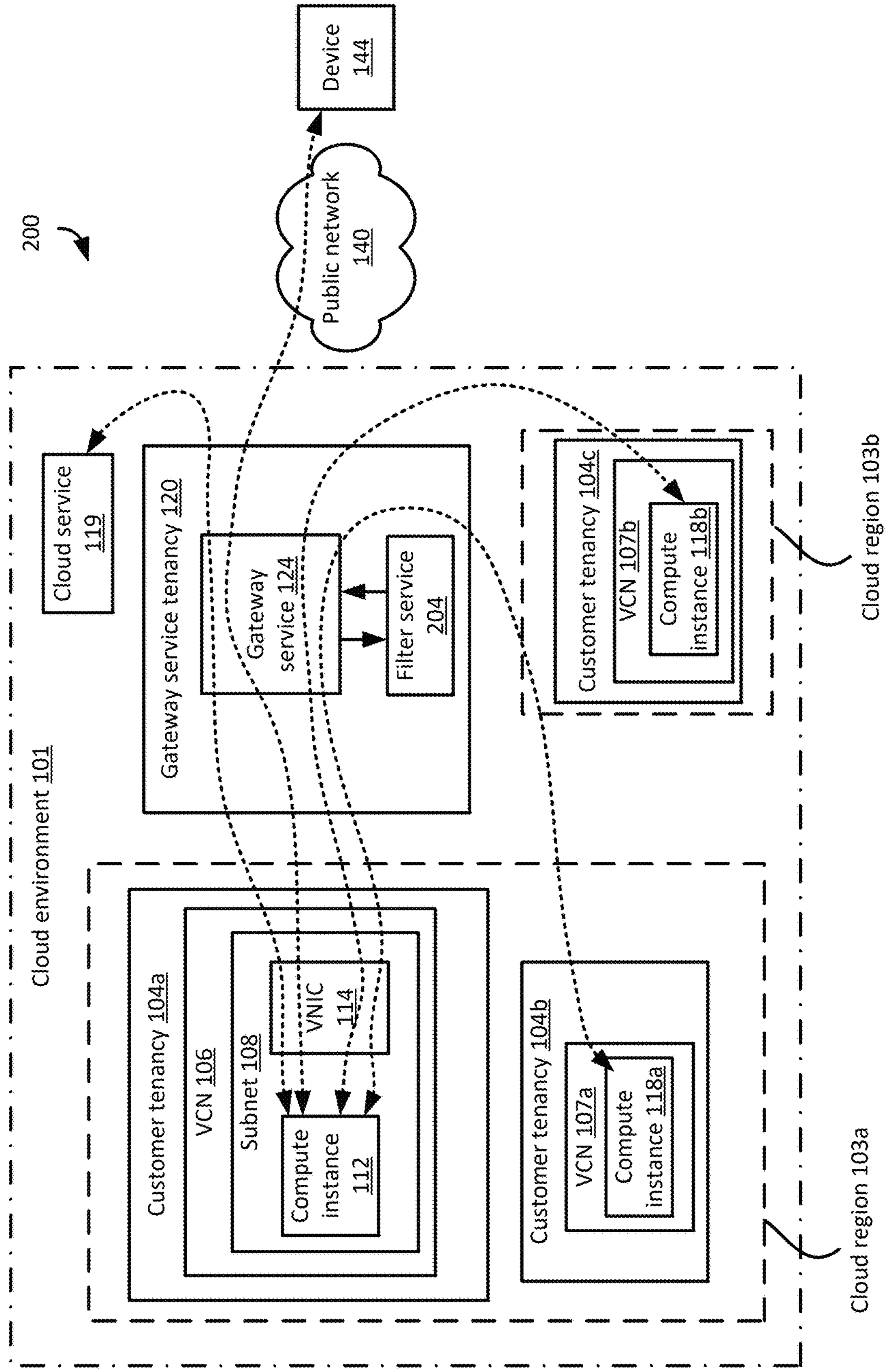
FIG. 2 illustrates a block diagram of a system including a cloud environment, wherein the cloud environment comprises a gateway service tenancy executing a generic gateway service and a corresponding filter service.

FIG. 2 illustrates a block diagram of a system 100 including a cloud environment 101, wherein the cloud environment 101 comprises a gateway service tenancy 120 executing a generic gateway service 124 and a corresponding filter service 128. The system 200 of FIG. 2 is at least in part similar to the system 100 of FIG. 1. In addition to the components of the system 100 of FIG. 1, the system 200 includes the filter service 128 implemented within the gateway service tenancy 120. Similar components in FIGS. 1 and 2 are labelled using the same labels.

In a typical scenario, a cloud customer renting a customer tenancy within a cloud environment may use cloud resources within the customer tenancy, independent of any oversight from a provider of the cloud environment. For example, the cloud customer can ingress and/or egress data from and/or to the customer tenancy, with minimal or no oversight from the provider of the cloud environment or from another third party. However, in the cloud environment 101, in the context of software assurance, an additional role of an assurance administrator is added into the picture. The assurance administrator may or may not be the same as the cloud provider. In an example, the assurance administrator acts as a "trusted technology provider" (TTP). With regard to the subject disclosure, in an example, the assurance administrator has a monitoring role over a manner in which the cloud customer is using cloud resources within the customer tenancy 104*a*. Merely as an example, the assurance administrator may want to at least in part monitor traffic going to, or coming out of the customer tenancy 104*a*. For example, the assurance administrator may want to at least in part monitor ingress and/or egress traffic of the customer tenancy 104*a*. For example, the assurance administrator may want to ensure that the cloud customer is compliant with guidelines mutually agreed between the cloud customer and the assurance administrator, although other example monitoring use cases (such as reasons behind such monitoring) may also be possible. In an example, the assurance administrator may be tasked by a government regulatory agency to monitor the customer tenancy 104*a*, e.g., to ensure that the customer tenancy 104*a* adheres to regulatory guidelines established by the government regulatory agency. For example, there may be a lack of trust between the assurance administrator and the cloud customer. Accordingly, the assurance administrator may have zero trust on ingress traffic and/or egress traffic of the customer tenancy 104*a*.

For example, as a part of such software assurance, the assurance administrator may want to review and analyze traffic routed to and/or from the customer tenancy 104*a*. Anomalies or issues detected during such review and analysis process may be reported back to the assurance administrator. For example, detected anomalies or issues may result in corrective action, such as redaction or removal of the detected anomalies. Additionally or alternatively, in another example, reporting actions may be undertaken, such as reporting the anomalies to a reporting authority. In an example, if the anomalies or issues indicate security risks, the assurance administrator may take corrective actions, such as removal or redaction of the anomalies or issues, denial of passage of the traffic to its target destination, and/or may report the anomalies or issues to a higher reporting authority (such as the government regulatory agency). If no anomalies are detected within a plurality of data packets, the data packets are allowed passage to their intended destination. Software assurance actions taken by the assurance administrator may be implementation specific, and may vary from one implementation to the next. In an example, actions undertaken upon detecting anomalous issues may be implementation specific, and also described below.

In an example, to facilitate reviewing and analyzing the traffic routed to and/or from the customer tenancy 104*a*, the gateway service tenancy 120 comprises a filter service 204. The filter service 204 implements a filter chain (described below in further detail), where filter service 204 reviews traffic being transmitted to and/or from the customer tenancy 104*a*. Thus, the filter service 204 works in conjunction with the gateway service 124, to implement software assurance for the customer tenancy 104*a*.

In an example, it is assumed that "requests" are transmitted to and/or from the customer tenancy 104*a*. Such a request may include any appropriate type of payload being transmitted to and/or from the customer tenancy 104*a*. For example, the compute instance 112 may transmit an API request to the device 144 through the gateway service 124, and the device 144 may transmit a corresponding API response to the compute instance 112 through the gateway service 124, and both such API request and API response are termed as "requests" being transmitted to and/or from the customer tenancy 104*a* through the gateway service 124.

Similarly, in another example, the compute instance 112 may transmit a memory request to the compute instance 118*a* through the gateway service 124, and the compute instance 118*a* may transmit data from a memory to the compute instance 112 through the gateway service 124, and both such memory request and the data are termed as "requests" being transmitted to and/or from the customer tenancy 104*a* through the gateway service 124. Each request being transmitted to and/or from the customer tenancy 104*a* comprises a plurality of data packets, which are transmitted through the gateway service 124.

In an example, the gateway service 124 intercepts any incoming or outgoing request to or from the customer tenancy 104*a*. The filter service 204 parses and analyzes each such request, to detect any possible anomaly with the request. If an anomaly is detected, the filter service 204 undertakes corrective action (such as redact or remove the data causing the anomaly, report the anomaly to the assurance administrator, deny passage of the request to a target destination, and/or the like). On the other hand, if no anomaly is detected, the request is allowed passage to its intended destination.

In an example, because the filter service 204 reviews and analyzes contents of the requests routed to and/or from the customer tenancy 104*a*, the filter service 204 has to process the requests at layer 7 or application layer of the protocol stack. For example, data packets corresponding to a request (which is routed to or from the customer tenancy 104*a* via the gateway service 124) are initially processed by the gateway service 124 at layer 3 (network layer) or layer 4 (transport layer). However, at layers 3 or 4, the filter service 204 may not be able to inspect and analyze an entirety of the request. Rather, at layers 3 or 4, the filter service 204 may be able to merely review individual data packets of a plurality of such requests. Accordingly, the gateway service 124 transforms the layer 3 or layer 4 data packets of the request to layer 7. At layer 7, the request is fully available for analysis by the filter service 204. Accordingly, the gateway service 124 transforms the data packets at layer 3 or layer 4 to reconstruct the request at layer 7, and the filter service 204 analyzes the requests at layer 7. Thus, the gateway service 124 operates and processes requests at layer 7. Furthermore, as the filter service 204 analyzes the requests at layer 7, the filter service 204 is able to analyze an entirety of a request at layer 7, and flag any anomalous issues detected within the request.

In an example, the gateway service 124 supports one or more of a plurality of layer 7 or application layer protocols, such as Transmission Control Protocol (TCP), Hyper Text Transfer Protocol (HTTP), Hypertext Transfer Protocol Secure (HTTPS), gRPC Remote Procedure Calls (gRPC), Websocket, GraphQL, Thrift interface definition language (IDL), Simple Mail Transfer Protocol (SMTP), Secure Shell (SSH), and/or one or more other layer 7 protocols that may be used within the cloud environment 101.

Note that if the unified and generic gateway service 124 is replaced by a plurality of individual gateways (such as an LPG, an RPG, an IGW, a NAT gateway, a SWG, and/or a DRG), each such gateway has to have a corresponding filter service. In contrast, as the gateway service 124 is a unified and generic gateway service replacing such plurality of gateways, a unified filter service 204 (or a combination of such filter services) can cater to all such requests being transmitted through the generic gateway service 124 and to and/or from the customer tenancy 104*a*, in an example.

Figure 3A:
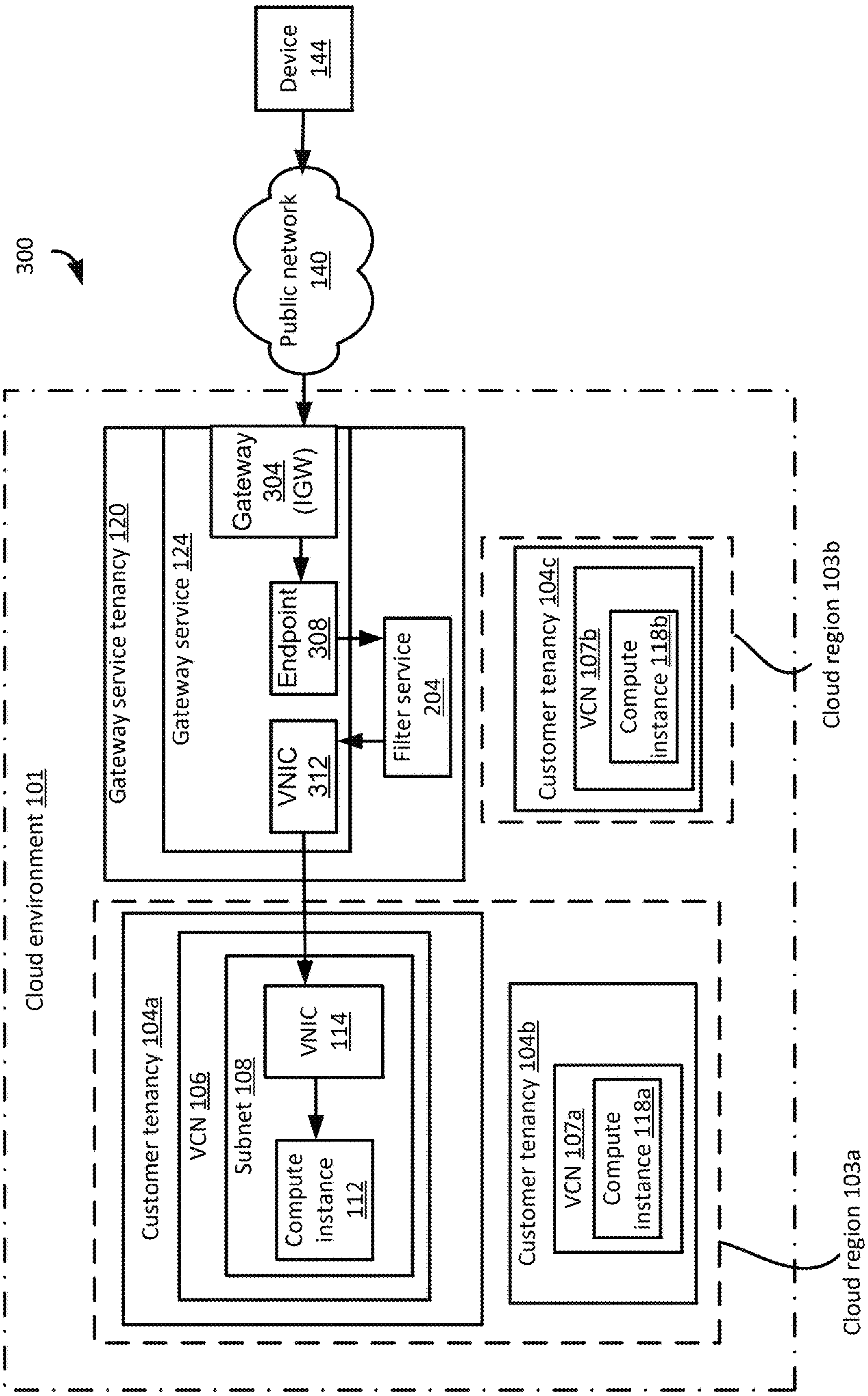
FIG. 3A illustrates transmission of an ingress request to a compute instance within a virtual cloud network (VCN) of a customer tenancy from a public network, where the request is routed through a gateway service.

FIG. 3A illustrates transmission of an ingress request to a compute instance 112 within a VCN 106 of a customer tenancy 104*a* from a public network 140 (such as the Internet), where the request is routed through a gateway service 124. Thus, in this example, the compute instance 112 receives requests from a website (e.g., an IP address) over the public network 140.

In an example, the cloud customer, after generating the compute instance 112, configures a VNIC 114 within the subnet 108 of the VCN 106. The VNIC 114 is for transmission of requests to and/or from the compute instance 112.

The cloud customer and/or the assurance administrator also creates a VNIC 312 within the gateway service 124. The VNIC 312 may be dedicated towards communication with the compute instance 112, and/or may be used for communication with other compute instances of the subnet 108.

Furthermore, the cloud customer and/or the assurance administrator also create an endpoint 308 within the gateway service 124. The endpoint 308 is specifically associated with a specific website or a specific public IP address accessible over the public network 140. For example, assume that the ingress of requests in FIG. 3A is from a website www.patent_example1.com. So, the endpoint 308 is associated specifically with this website (or an IP address associated with this website). Thus, this endpoint 308 is created for ingress traffic only and specifically from this website, or an IP address associated with this website. Traffic incoming to the compute instance 112 (or to another compute instance within the customer tenancy 104*a*) will appear to come from this endpoint 308. As this endpoint is created for a specific website or an associated IP address, the assurance administrator and/or the cloud customer may not have to be cautious about random inbound or outbound internet access for the compute instance 112, such as from another public IP address. Thus, inbound traffic to the customer tenancy 104*a*, from a public IP address, may be possible only if a corresponding endpoint has been created specifically for this public IP address. The endpoint 308 receives requests from the public network 140 through a gateway 304 implemented by the gateway service 124. The gateway 304 may act as an Internet gateway (IGW), to receive inbound requests from the public network 140.

In an example, ingress requests from the endpoint 308 are routed through the filter service 204, which analyzes the request, and takes corrective actions if anomaly is detected within a request. If no anomaly is detected, the request is granted passage to the compute instance 112 through the VNICs 312 and 114. Operation of the filter service 204 will be described below in further detail.

Note that as described above, the gateway service 124 operates and processes requests at layer 7. For example, data packets corresponding to a plurality of requests arrive at the gateway service 124 at a layer 3 or layer 4 level, the endpoint 308 (or another appropriate component of the gateway service 124) processes such data packets, to generate each such corresponding requests at layer 7. Accordingly, the filter service 204 processes each such requests at layer 7 or application layer (also described below in detail).

Figure 3B:
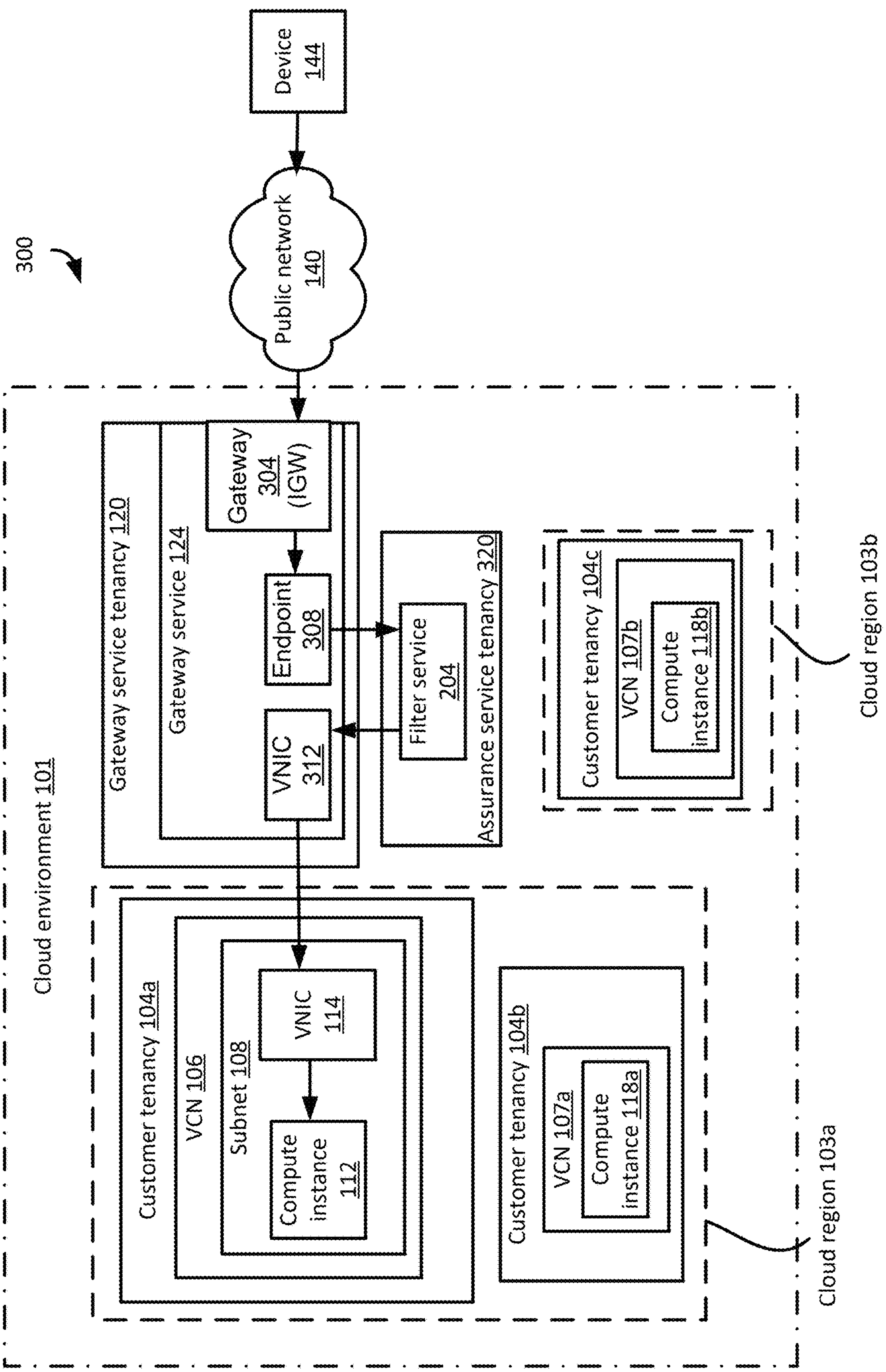
FIG. 3B illustrates transmission of an ingress request to a compute instance within a VCN of a customer tenancy from a public network (such as the Internet), where the request is routed through (i) a gateway service within a gateway service tenancy and (ii) a filter service within an assurance service tenancy.
Figure 3C:
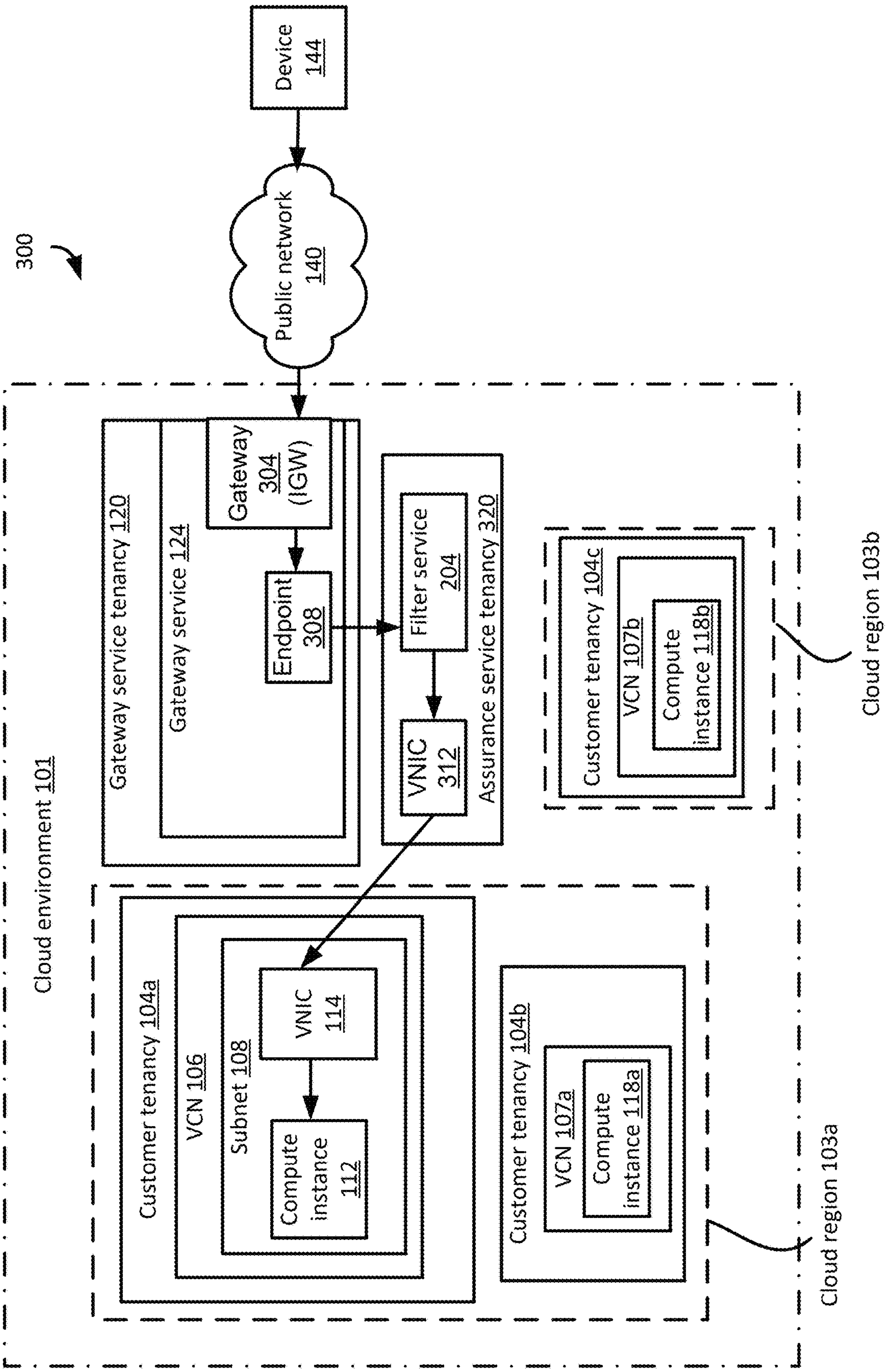
FIG. 3C illustrates transmission of an ingress request to a compute instance within a VCN of a customer tenancy from a public network (such as the Internet), where the request is routed through (i) a gateway service within a gateway service tenancy and (ii) a filter service and a virtual network interface card (VNIC) within an assurance service tenancy.

In FIG. 3A, the filter service 204 and the VNIC 312 are illustrated to be within the gateway service tenancy 120. However, in an example, one or both the filter service 204 and the VNIC 312 may be in a tenancy that is different from the gateway service tenancy 120, as illustrated in FIGS. 3B and 3C. FIG. 3B illustrates transmission of an ingress request to a compute instance 112 within a VCN 106 of a customer tenancy 104*a* from a public network 140 (such as the Internet), where the request is routed through (i) a gateway service 124 within a gateway service tenancy 120 and (ii) a filter service 204 within an assurance service tenancy 320. FIGS. 3A and 3B are at least in part similar. However, in FIG. 3A, the filter service 204 is within the gateway service tenancy 120. In contrast, in FIG. 3B, the filter service 204 is within a separate tenancy, also referred to herein as the assurance service tenancy 320. In this example, the assurance service tenancy 320 may be operated by personnel of the assurance administrator and/or the provider of the cloud environment 101, and the cloud customer may not have privileges to configure, access, and/or operate the assurance service tenancy 320.

FIG. 3C illustrates transmission of an ingress request to a compute instance 112 within a VCN 106 of a customer tenancy 104*a* from a public network 140 (such as the Internet), where the request is routed through (i) a gateway service 124 within a gateway service tenancy 120 and (ii) a filter service 204 and a VNIC 312 within an assurance service tenancy 320. FIGS. 3A and 3C are at least in part similar. However, in FIG. 3A, the filter service 204 and the VNIC 312 are within the gateway service tenancy 120. In contrast, in FIG. 3C, the filter service 204 and the VNIC 312 are within the assurance service tenancy 320. In this example, the assurance service tenancy 320 may be operated by personnel of the assurance administrator and/or the provider of the cloud environment 101, and the cloud customer may not have privileges to configure, access, and/or operate the assurance service tenancy 320.

Figure 4:
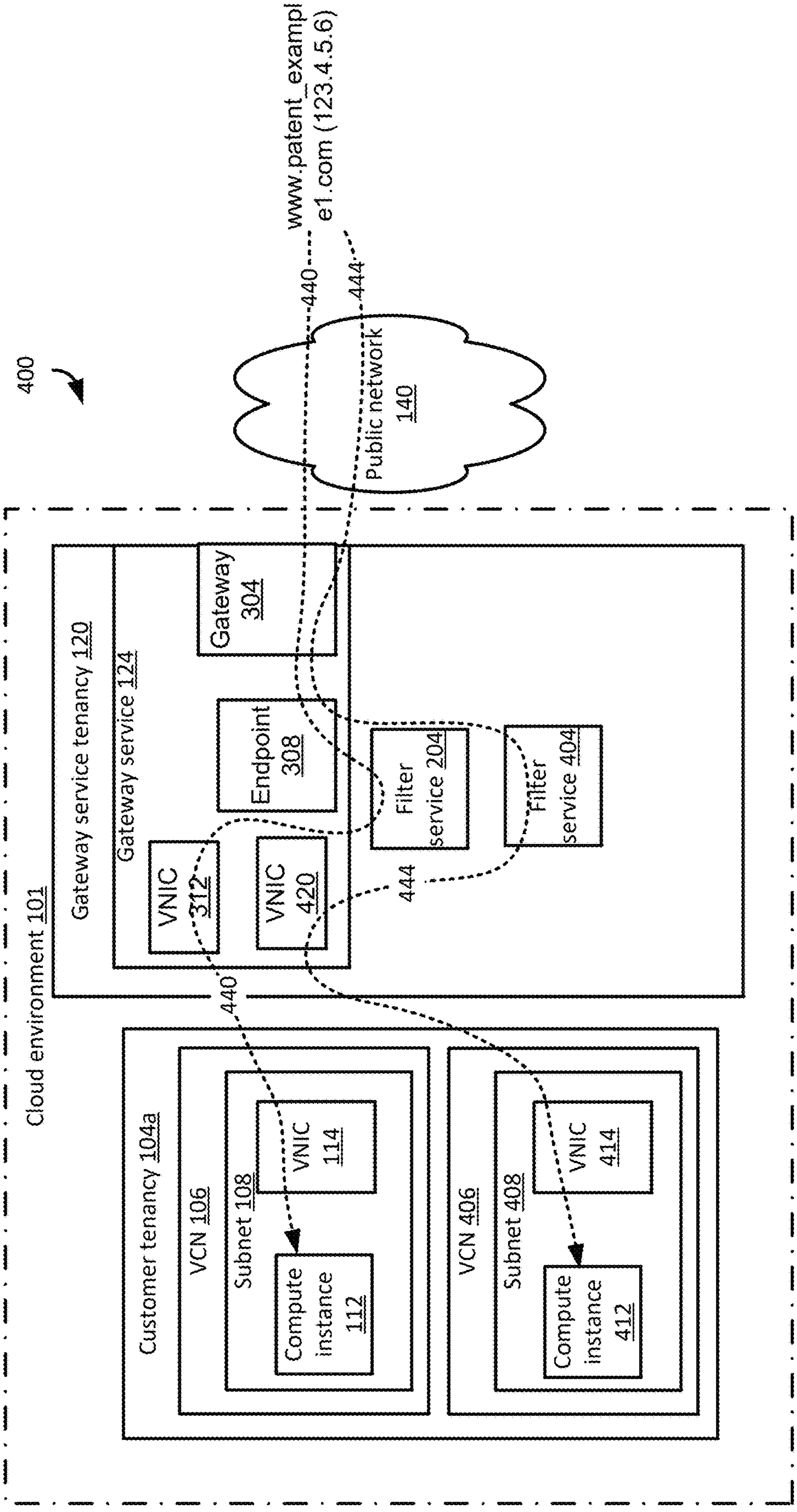
FIG. 4 illustrates transmission of two ingress requests to two different compute instances from a public IP address over a public network (such as the Internet), where the requests are routed through a gateway service.

FIG. 4 illustrates transmission of two ingress requests 440 and 444 to two different compute instances 112 and 412 from a public IP address over a public network 140 (such as the Internet), where the requests 440, 444 are routed through a gateway service 124. In FIG. 4, some of the customer tenancies (such as customer tenancies 104*b*, 104*c*) of FIGS. 1 and 2 are not illustrated for purposes of illustrative clarity. Routes of the requests 440, 444 are illustrated using dotted lines in FIG. 4.

In the example of FIG. 4, the customer tenancy 104*a* includes an additional VCN 406 including at least one subnet 408, which includes at least one compute instance 412 and a corresponding VNIC 414. In the example of FIG. 4, the requests 440, 444 originate from an example website www.patent_example1.com, having an example IP address of 123.4.5.6. Note that the gateway service 124 also has a corresponding VNIC 420 for communicating with compute instance 412 of the subnet 408.

As the endpoint 308 is defined for specifically this website (e.g., www.patent_example1.com) and/or for specifically this IP address (e.g., 123.4.5.6), all requests originating from this website and/or for this IP address and destined for the customer tenancy 104*a* are to be routed through the endpoint 308. For example, requests from other websites and/or IP addresses on the Internet are rejected by the endpoint 308, as the endpoint 308 specifically accepts incoming traffic only from this website and/or from this IP address.

As illustrated, the request 440 is routed from the public network 140, through the gateway 304, the endpoint 308, the filter service 204, the VNICs 312 and 114, and finally reaches its intended target, which is the compute instance 112. Similarly, the request 444 is routed from the public network 140, through the gateway 304, the endpoint 308, another filter service 404, the VNICs 420 and 414, and finally reaches its intended target, which is the compute instance 412.

Note that in this example, two filter services 204 and 404 are depicted for the two requests 440, 444, respectively, being transmitted to the compute instances 112 and 412, respectively, although other examples may include a single filter service analyzing both the requests 440 and 444.

Figure 5:
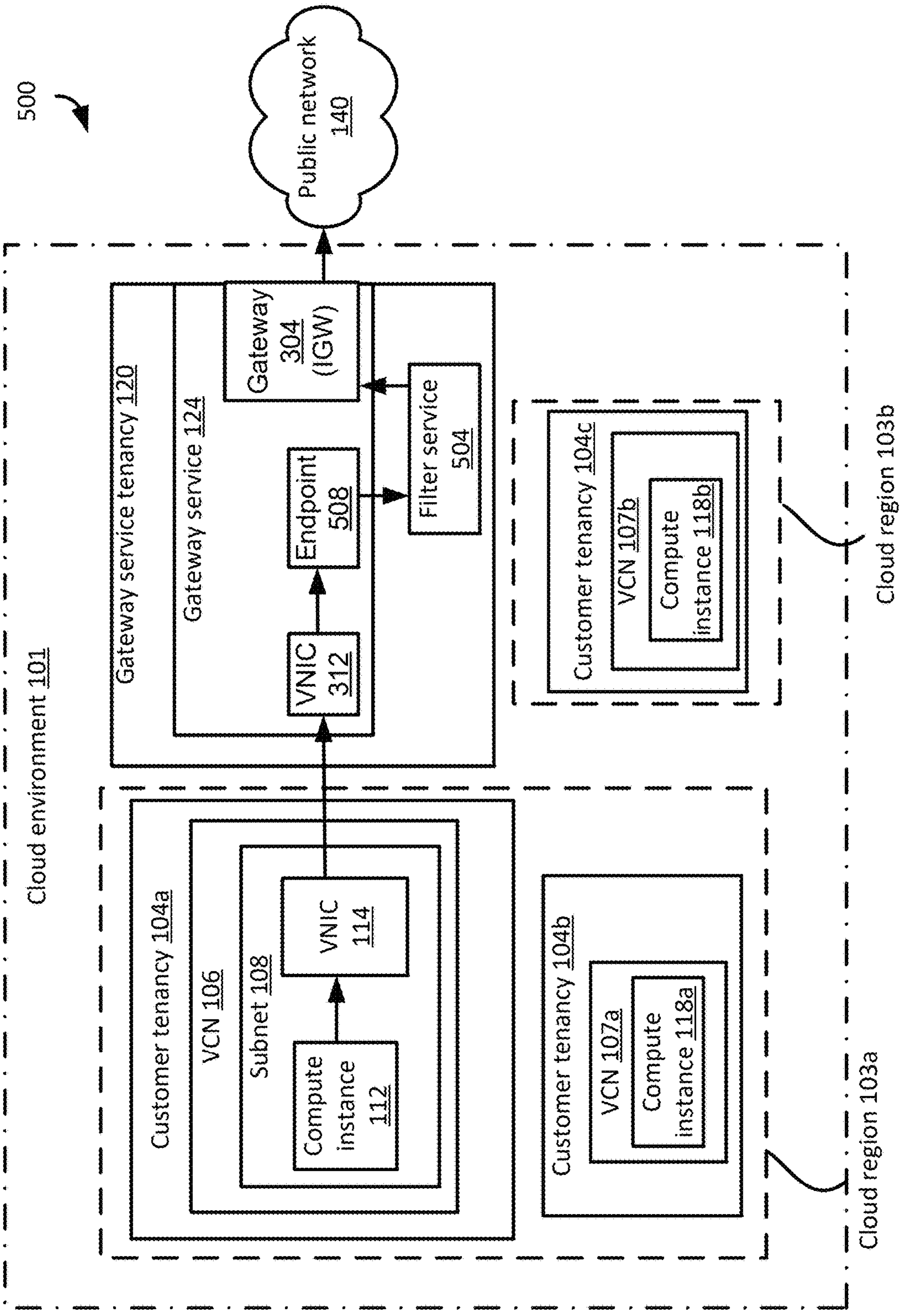
FIG. 5 illustrates transmission of an egress request from a compute instance within a VCN of a customer tenancy to a public network (such as the Internet), where the request is routed through a gateway service.

FIG. 5 illustrates transmission of an egress request from a compute instance 112 within a VCN 106 of a customer tenancy 104*a* to a public network 140 (such as the Internet), where the request is routed through a gateway service 124. Thus, in this example, the compute instance 112 transmits outbound requests to the public network 140.

In an example, the cloud customer, after generating the compute instance 112, configures the VNIC 114 within the subnet 108 of the VCN 106. The VNIC 114 is for transmission of requests to and/or from the compute instance 112. The cloud customer and/or the assurance administrator also creates the VNIC 312 within the gateway service 124. The VNIC 312 may be dedicated towards communication with the compute instance 112, or may be used for communication with one or more other compute instances of the subnet 108.

Furthermore, the cloud customer and/or the assurance administrator also create an endpoint 508 within the gateway service 124. The endpoint 508 is specifically associated with outbound requests from the compute instance 112. Thus, this endpoint 508 is created specifically for egress traffic from the compute instance 112. Outgoing traffic from the compute instance 112 will appear to come from this endpoint 508. The endpoint 508 receives requests from the compute instance 112 through the VNICs 114 and 312.

In an example, egress requests from the endpoint 508 are routed through a filter service 504, which analyzes the request, and takes corrective actions if anomaly is detected within a request. If no anomaly is detected, the request is granted passage to the gateway 304. The gateway 304 may act as an Internet gateway (IGW), to transmit outbound requests to the public network 140.

Note that as described above, the gateway service 124 operates and processes requests at layer 7. For example, data packets corresponding to a plurality of requests arrive at the gateway service 124 at a layer 3 or layer 4 level, the endpoint 508 (or another appropriate component of the gateway service 124) processes such data packets, to generate each such corresponding requests at layer 7. Accordingly, the filter service 504 processes each such requests at layer 7 or application layer.

Figure 6:
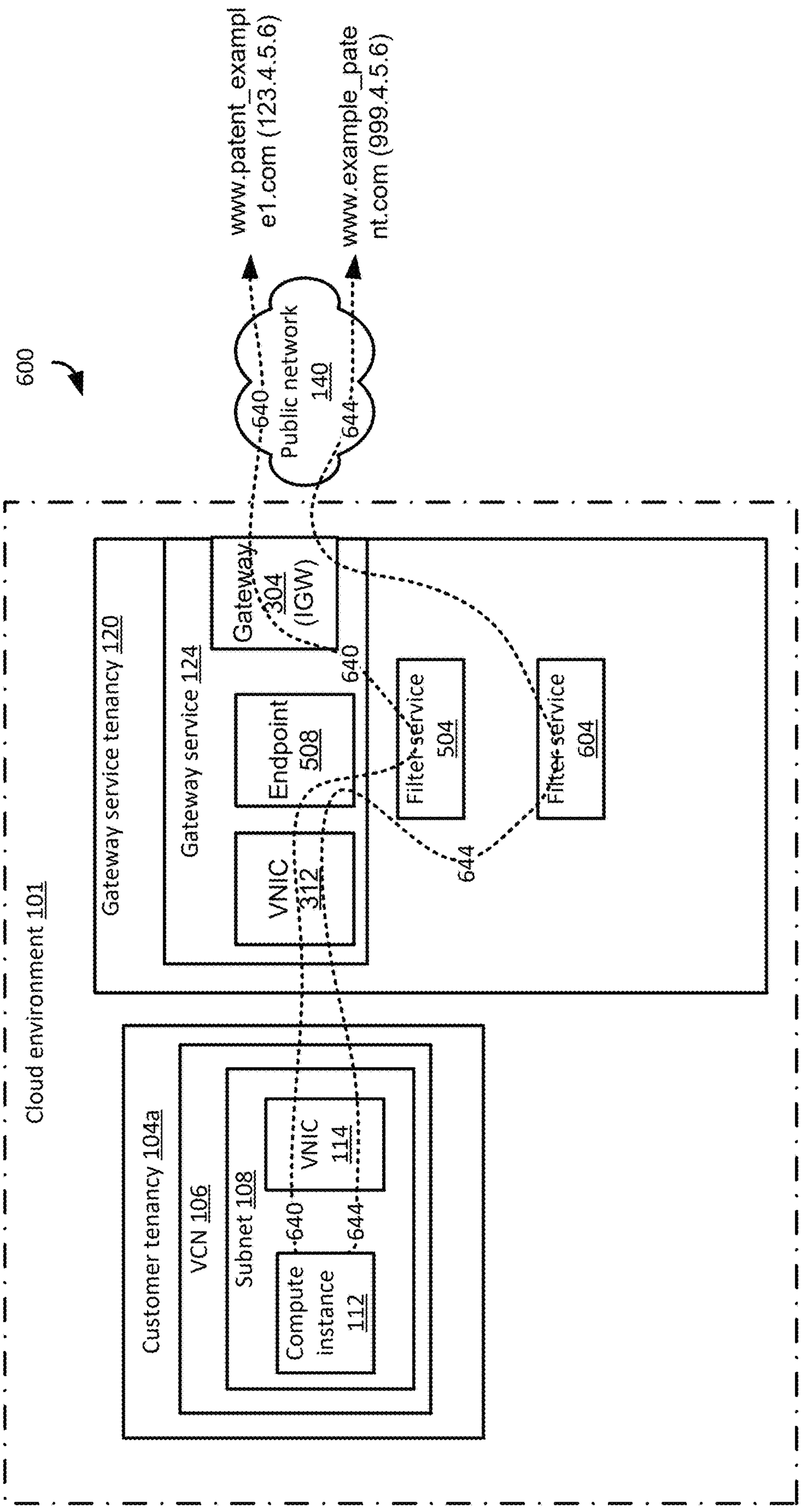
FIG. 6 illustrates transmission of two egress requests to two different websites (or two different corresponding IP addresses) over a public network (such as the Internet), where the two requests are routed through a gateway service.

FIG. 6 illustrates transmission of two egress requests 640 and 644 to two different websites (or two different corresponding IP addresses) over a public network 140 (such as the Internet), where the two requests 640, 644 are routed through a gateway service 124. In FIG. 6, some of the customer tenancies (such as customer tenancies 104*b*, 104*c*) of FIGS. 1 and 2 are not illustrated for purposes of illustrative clarity.

In the example of FIG. 6, the request 640 is destined for an example website www.patent_example1.com, with an example IP address 123.4.5.6. The request 644 is destined for an example website www.example_patent.com, with an example IP address 999.4.5.6. In an example, as the endpoint 508 is defined specifically for egress requests from the compute instance 112, both the requests 640 and 644 are routed through the endpoint 508.

As illustrated, the request 640 is routed from the compute instance 112, through the VNICs 114, 312, the endpoint 508, the filter service 504, the gateway 304, and over the public network 140. Similarly, the request 644 is routed from the compute instance 112, through the VNICs 114, 312, the endpoint 508, another filter service 604, the gateway 304, and over the public network 140. Note that in this example, two filter services 504 and 604 are depicted for analyzing requests being transmitted to the two websites, although other examples may include a single filter service for analyzing both requests.

Figure 7:
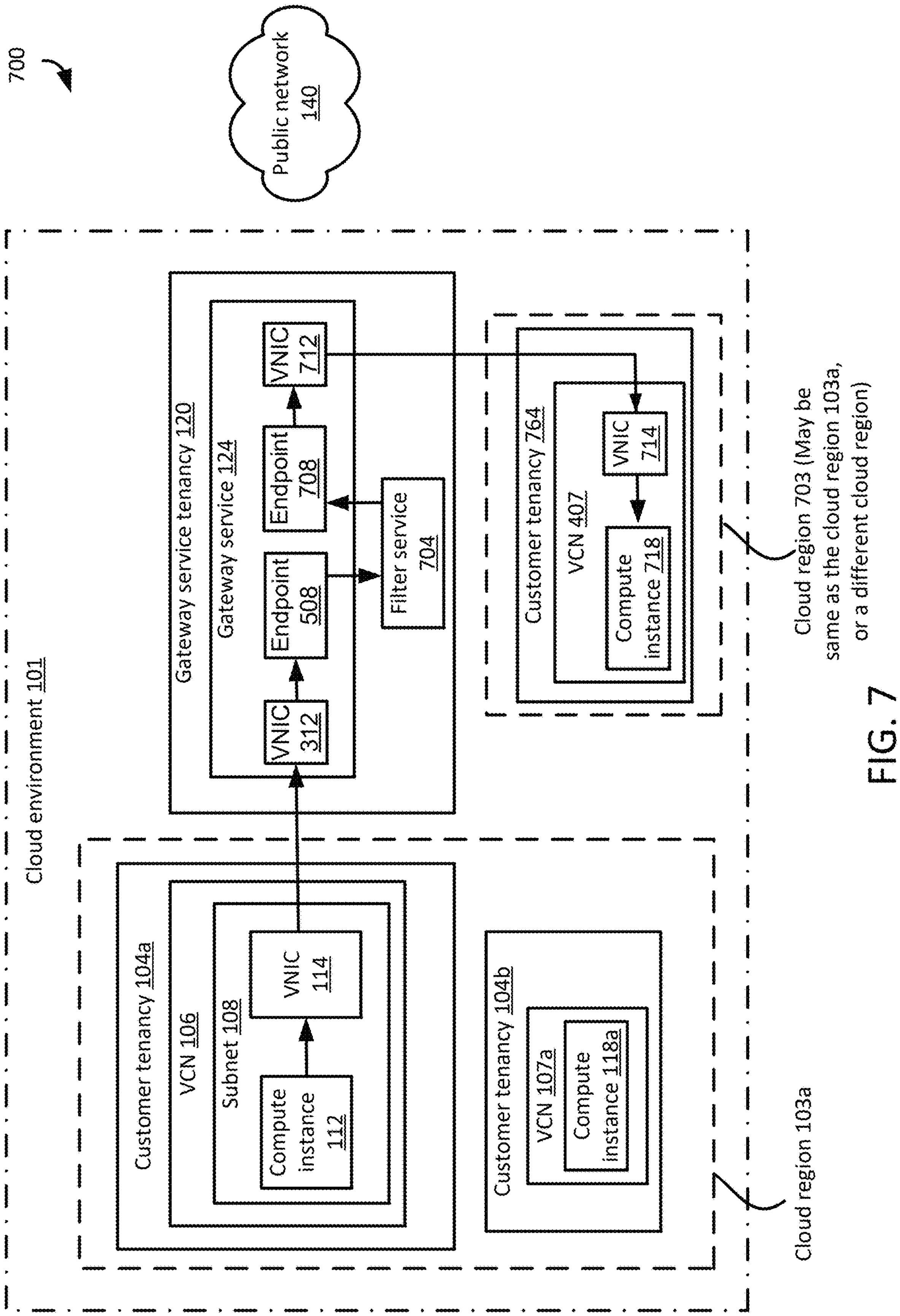
FIG. 7 illustrates transmission of a request from a compute instance within a VCN of a customer tenancy to another compute instance within another VCN of another customer tenancy.

FIG. 7 illustrates transmission of a request from a compute instance 112 within a VCN 106 of a customer tenancy 104*a* to another compute instance 718 within another VCN 407 of another customer tenancy 764.

In an example, the VCN 407 of the customer tenancy 764, which includes the compute instance 718, is within a cloud region 703. In an example, (i) the cloud region 703 and (ii) the cloud region 103*a* including the VCN 106 and the compute instance 112 are the same. In another example, the cloud region 703 and the cloud region 103*a* including the VCN 106 and the compute instance 112 are different cloud regions. Thus, the gateway service 124 can act as a local peering gateway (LPG) for VCN-to-VCN connectivity within a same cloud region, or a remote peering gateway (RPG) for VCN-to-VCN connectivity between two different cloud regions.

In an example, initially, the cloud customer and/or the assurance administrator creates an endpoint 708 within the gateway service 124, where the endpoint 708 is communicatively coupled to the compute instance 718 through a VNIC 712 within the gateway service 124 and a VNIC 713 within a subnet of the compute instance 718. The endpoint 708 acts as an ingress proxy for the compute instance 718.

The cloud customer and/or the assurance administrator creates another endpoint 508 (also see FIG. 5) within the gateway service 124, where the endpoint 508 is communicatively coupled to the compute instance 112 through the VNIC 312 within the gateway service 124 and the VNIC 114 within the subnet 108. In an example, the endpoint 308 acts as an egress proxy for the compute instance 112.

Subsequently, the assurance administrator and/or the cloud customer allows ingress access to the endpoint 708 from the egress endpoint 508. As illustrated, requests from the endpoint 508 to the endpoint 708 passes through the filter service 704, which analyzes the requests being transmitted and performs software assurance on the requests, as also described above.

Figure 8:
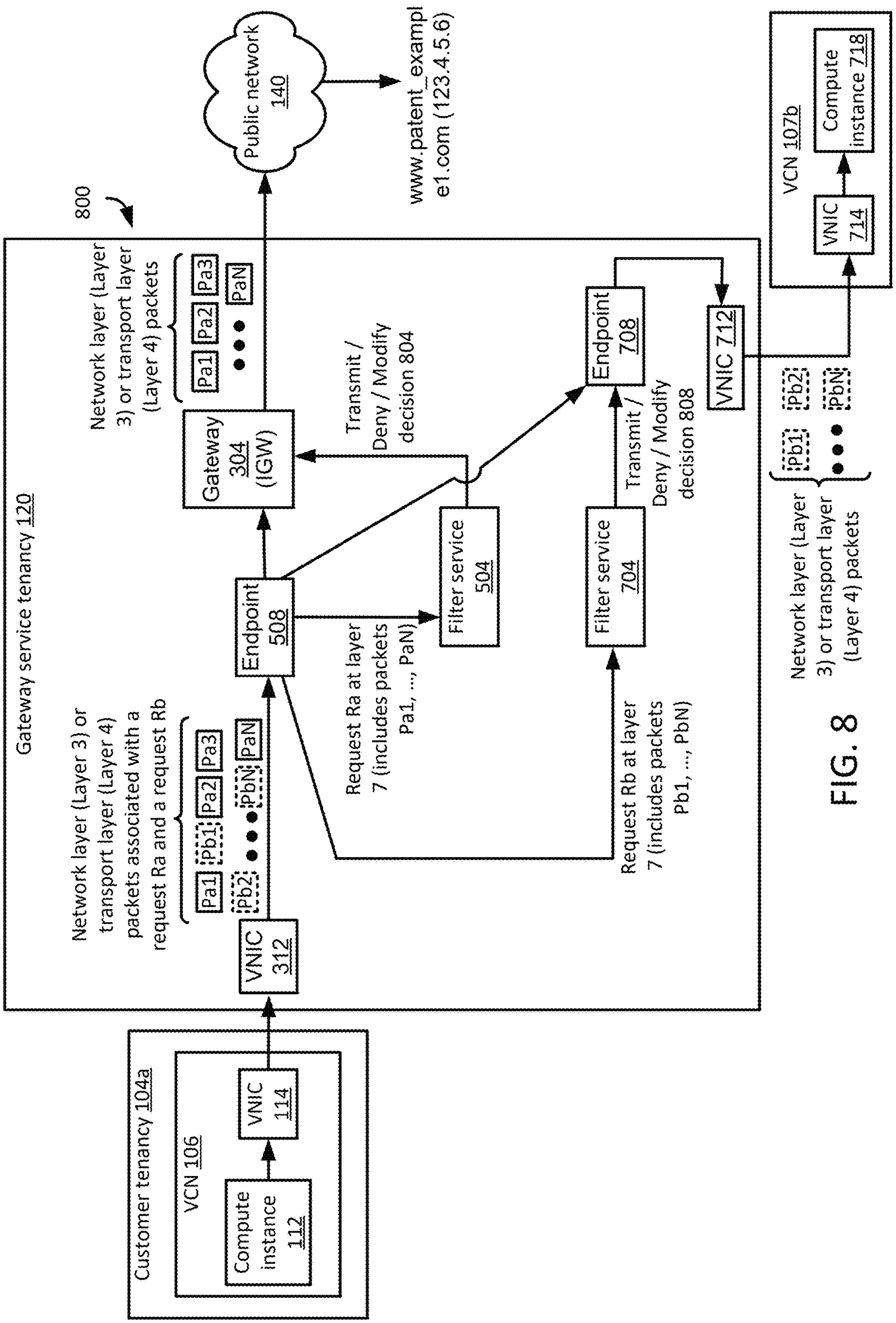
FIG. 8 illustrates transmission of two requests from a compute instance within a VCN of a customer tenancy to respectively (i) a website or an IP address over a public network, and (ii) another compute instance within another VCN.

FIG. 8 illustrates transmission of two requests Ra and Rb from a compute instance 112 within a VCN 106 of a customer tenancy 104*a* to respectively (i) a website or an IP address over a public network 140, and (ii) another compute instance 718 within another VCN 107*b*. For example, the request Ra is destined for the IP address (example of which is illustrated in FIG. 8), and the request Rb is destined for the compute instance 718.

The endpoint 508 of the gateway service tenancy 120 receives the requests Ra and Rb. The requests Ra and Rb are received at layer 3 or layer 4, such that packets Pa1, Pa2, . . . , PaN corresponding to the request Ra and packets Pb1, Pb2, . . . , PbN corresponding to the request Rb are received at the endpoint 508. The packets Pa1, Pa2, . . . , PaN and Pb1, Pb2, . . . , PbN may be intermingled and received at any order. For purposes of illustrative clarity, the packets Pa1, Pa2, . . . , PaN are illustrated using solid lines, and the packets Pb1, Pb2, . . . , PbN are illustrated using dotted lines.

Merely by looking at individual packets Pa1, Pa2, . . . , PaN, the filter service 504 (described above) may not be able to analyze full context and anomalous issues associated with the request Ra. Accordingly, the endpoint 508 transforms the layer 3 or layer 4 packets Pa1, Pa2, . . . , PaN to a layer 7 (application layer) level, such that the filter service 504 receives the request Ra at layer 7. Similarly, the endpoint 508 transforms the layer 3 or layer 4 packets Pb1, Pb2, . . . , PbN to a layer 7 level, such that the filter service 704 receives the request Rb at layer 7.

The filter service 504 analyzes the request Ra, and provides a decision 804. The decision 804 may be to one of (i) transmit the packets Pa1, . . . , PaN to their intended destination, (ii) deny transmission of the packets Pa1, . . . , PaN to their intended destination, or (iii) appropriately modify one or more of the packets Pa1, . . . , PaN, prior to transmitting the packets Pa1, . . . , PaN to their intended destination. For example, if no anomaly is detected within the request Ra, the filter service 504 may render a decision 804 to allow passage of the packets Pa1, . . . , PaN to their intended destination. If, however, one or more anomalous issues are detected, the filter service 504 may decide to either (i) deny transmission of the packets Pa1, . . . , PaN to their intended destination, or (ii) appropriately modify one or more of the packets Pa1, . . . , PaN, prior to transmitting the packets Pa1, . . . , PaN to their intended destination. If one or more anomalous issues are detected, the decision to deny transmission of the packets or to modify the packets may be implementation specific, and may vary from implementation to the next.

The decision 804 is transmitted to the gateway 304 (or back to the endpoint 508). Based on the decision 804, the endpoint 508 and/or the gateway 304 act accordingly. For example, FIG. 8 illustrates an example in which layer 3 or layer 4 packets Pa1, . . . , PaN are allowed passage to the target IP address over the public network 140.

The filter service 704 similarly analyzes the request Rb, and provides a decision 808. The decision 808 may be to one of (i) transmit the packets Pb1, . . . , PbN to their intended destination, (ii) deny transmission of the packets Pb1, . . . , PbN to their intended destination, or (iii) appropriately modify one or more of the packets Pb1, . . . , PbN, prior to transmitting the packets Pb1, . . . , PbN to their intended destination. For example, if no anomaly is detected within the request Rb, the filter service 704 may render a decision 808 to allow passage of the packets Pb1, . . . , PbN to their intended destination. If, however, one or more anomalous issues are detected, the filter service 704 may decide to either (i) deny transmission of the packets Pb1, . . . , PbN to their intended destination, or (ii) appropriately modify one or more of the packets Pb1, . . . , PbN, prior to transmitting the packets to their intended destination, and such decision may be implementation specific, and may vary from implementation to the next. For example, FIG. 8 illustrates an example in which layer 3 or layer 4 packets Pb1, . . . , PbN are allowed passage to the compute instance 718 through the endpoint 708 and the VNICs 712 and 714.

Figure 9:
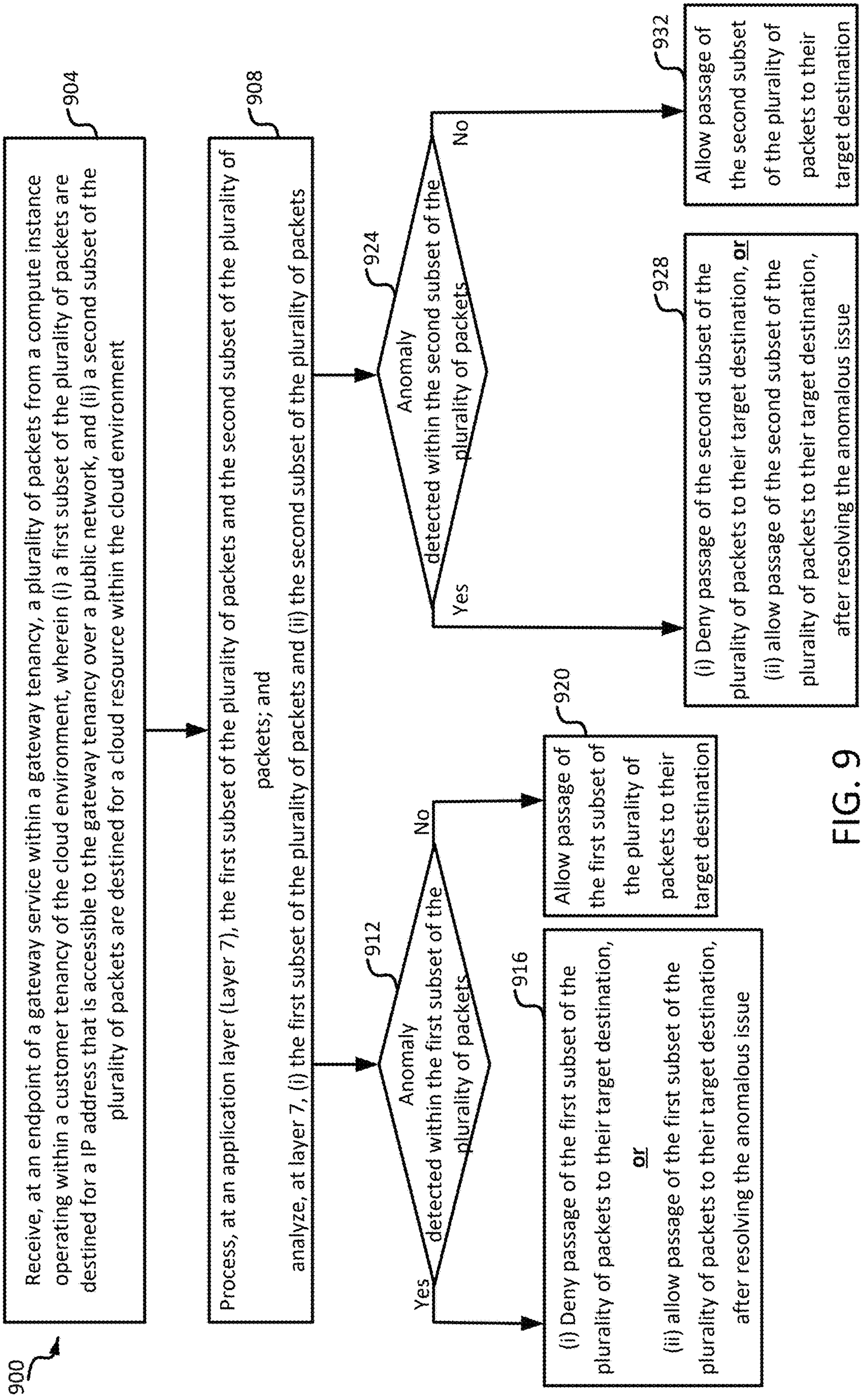
FIG. 9 is a flow diagram depicting a method for operating a generic gateway service.

FIG. 9 is a flow diagram depicting a method 900 for operating a generic gateway service, such as the gateway service 124 of any of FIGS. 1-8. The method 800 may be executed within any of the cloud environments described above, such as any of the cloud environments of FIGS. 1-8 described above.

The method 900 includes, at 904, receiving, at an endpoint of a gateway service within a gateway tenancy, a plurality of packets from a compute instance operating within a customer tenancy of the cloud environment. For example, as illustrated in FIG. 8, packets Pa1, . . . , PaN, Pb1, . . . , PbN are received at the endpoint 508 of the gateway service 124 within the gateway tenancy 120 and from the compute instance 112 operating within the VCN 106 of the customer tenancy 104*a*. Note that the gateway service 124 is not specifically labelled in FIG. 8, but components within the gateway service 124 have been described above (e.g., with respect to FIGS. 1-8) in further detail. In an example, the gateway tenancy 120 is responsible for software assurance of the customer tenancy 104*a*, such that all inbound and outbound requests to and/or from the customer tenancy 104*a* pass through the gateway tenancy 120. In an example, (i) a first subset of the plurality of packets (such as packets Pa1, . . . , PaN) are destined for an IP address that is accessible to the gateway tenancy over a public network, and (ii) a second subset of the plurality of packets (such as packets Pb1, . . . , PbN) are destined for a cloud resource (e.g., compute instance 718) within the cloud environment, as also illustrated in FIG. 8.

The cloud resource of FIG. 9 may be the compute instance 718 of FIG. 8, or may be a cloud service provided by the cloud provider (such as cloud service 119 of FIG. 1), or another cloud resource within the cloud environment described above.

At 908, the first subset of the plurality of packets and the second subset of the plurality of packets are processed at an application layer (Layer 7), e.g., by the endpoint and/or by another component of the gateway service. Also at 904, (i) the first subset of the plurality of packets and (ii) the second subset of the plurality of packets are analyzed at layer 7, e.g., by the filter services 504 and 704, respectively, as also described above.

From 908, the method 900 proceeds to 912 and 924. At 912, a filter service (such as the filter service 504) determines whether an anomaly is detected within the first subset of the plurality of packets.

If "Yes" at 912 (e.g., one or more anomalies are detected), the method 900 proceeds from 912 to 916. At 916, either (i) passage of the first subset of the plurality of packets to their target destination is denied, or (ii) passage of the first subset of the plurality of packets to their target destination is allowed, after resolving the anomalous issue (such as after modifying one or more of the first subset of the plurality of packets to resolve the anomalous issue). Whether to deny or modify the packets may be implementation specific, and/or may depend on a nature of the anomaly, in an example.

If "No" at 912 (e.g., no anomaly is detected), the method 900 proceeds from 912 to 920. At 920, passage of the first subset of the plurality of packets is allowed to their target destination, which may be the IP address. For example, the first subset of the plurality of packets is allowed passage over the public network 140 to their intended destination.

From 908, the method 900 also proceeds to 924. At 924, a filter service (such as the filter service 704) determines whether an anomaly is detected within the second subset of the plurality of packets.

If "Yes" at 924 (e.g., one or more anomalies are detected), the method 900 proceeds from 924 to 928. At 928, either (i) passage of the second subset of the plurality of packets to their target destination is denied, or (ii) passage of the second subset of the plurality of packets to their target destination is allowed, after resolving the anomalous issue (such as after modifying one or more of the second subset of the plurality of packets to resolve the anomalous issue). Whether to deny or modify the packets may be implementation specific, and/or may depend on a nature of the anomaly, in an example.

If "No" at 924 (e.g., no anomaly is detected), the method 900 proceeds from 924 to 934. At 934, passage of the second subset of the plurality of packets is allowed to their target destination, which may be the cloud resource.

Figure 10:
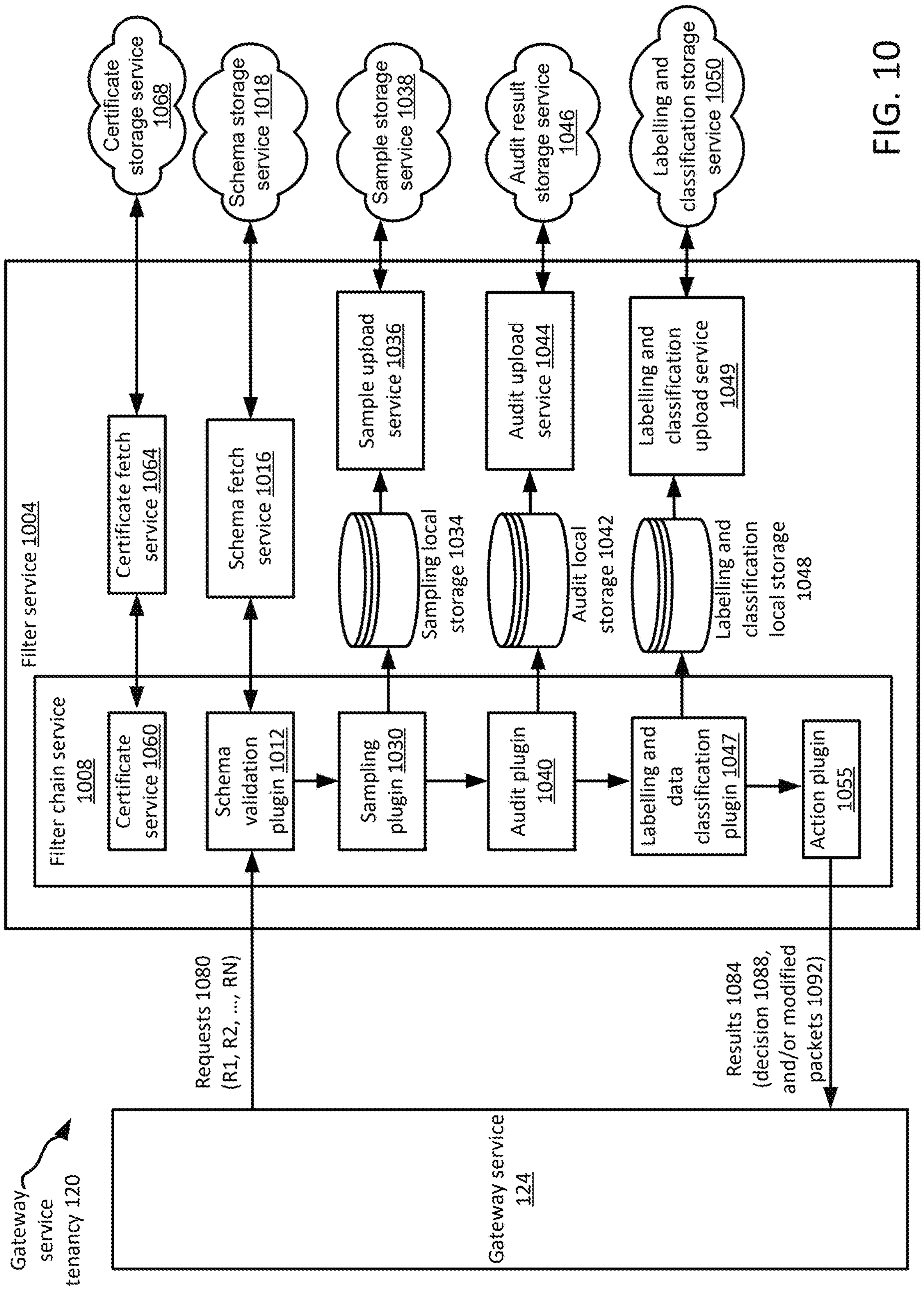
FIG. 10 illustrates a filter service that can be used in conjunction with a gateway service.

FIG. 10 illustrates a filter service 1004 that can be used in conjunction with any of the gateway services described herein. The filter service 1004 can be any of the filter services described above with respect to FIGS. 1-9. The filter service 1004, as described above with respect to FIGS. 1-9, may operate within a gateway tenancy, such as the gateway tenancy 120 described above.

For example, the filter service 1004 receives a series of requests 1080 from a gateway service 124. For each such request, the filter service 1004 aims to detect anomalous issues within the request. If no anomalous issues are detected within a request, the filter service 1004 instructs the gateway service 124 to allow passage of the request to its intended destination. If one or more anomalous issues are detected within a request, the filter service 1004 may instructs the gateway service 124 to either (i) deny passage of the request to its intended destination, or (ii) allow passage of the request to its intended destination, after the request has been appropriately modified to cure the anomalous issues. In response to detecting an anomalous issue, whether the filter service 1004 denies passage of the request, or allows passage of the request after modification to the request may be based on the detected specific anomalous issues, can be implementation specific, and vary from one implementation to the next.

As illustrated in FIG. 10, the filter service 1004 receives a series of requests 1080 from the gateway service 124, such as requests R1, R2, . . . , RN. The filter service 1004 processes the requests 1080, and renders a result 1084 for each request. For example, a result 1084 corresponding to a request, as described above, may include any of the following: (i) a decision 1088 to either allow or deny passage of the request to its intended destination, or (ii) modified packets 1092 of a corresponding request, which the filter service 1004 has modified upon detecting an anomalous issue with request, where the modified packets 1092 may be allowed passage to the intended destination.

In an example and as described above, the requests 1080 are layer 7 requests. For example, the gateway service 124 receives data packets associated with a request at layer 3 or layer 4, and transforms the data packets to the request at layer 7. In an example, the requests 1080 are in accordance with a layer 7 communication protocol, such as Transmission Control Protocol (TCP), Hyper Text Transfer Protocol (HTTP), Hypertext Transfer Protocol Secure (HTTPS), gRPC Remote Procedure Calls (gRPC), Websocket, GraphQL, Thrift interface definition language (IDL), Simple Mail Transfer Protocol (SMTP), Secure Shell (SSH), or another layer 7 protocol.

Figure 11:
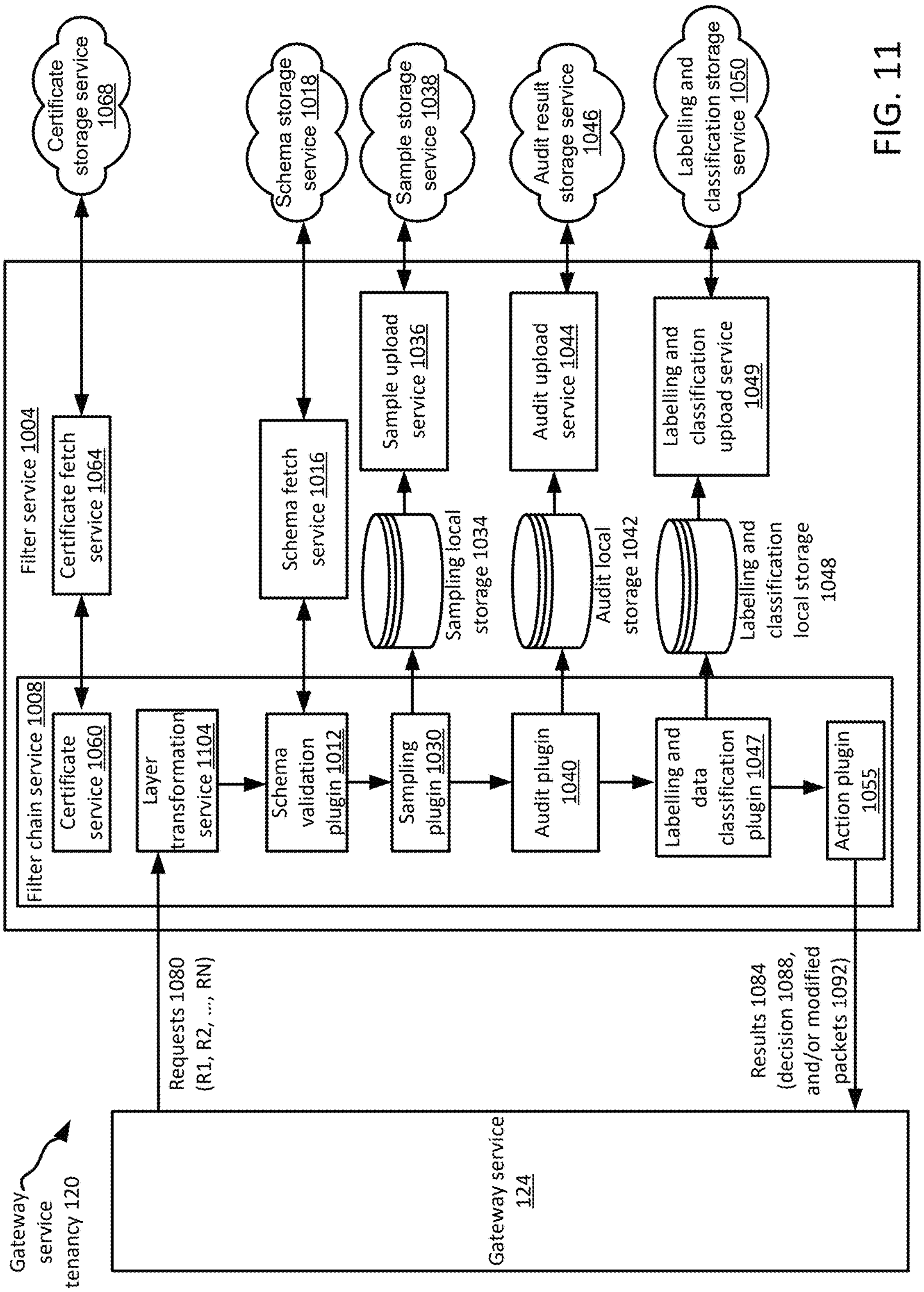
FIG. 11 illustrates another filter service that can be used in conjunction with a gateway service.

However, in another example and as illustrated in FIG. 11, the data packets associated with the requests 1080 may be received at a transport layer (layer 4) protocol from the gateway service 124. The filter chain service 1008 includes a layer transformation service 1104 that transforms the layer 4 packets to layer 7 requests, which are then processed by various plugins of the filter chain service 1008. FIG. 11 illustrates an example variation of a filter service 1004 that can be used in conjunction with any of the gateway services described above. In the example of FIG. 11, the gateway service 124 processes and transmits layer 4 packets to the filter service 1004, which are then transformed to layer 7 requests by the layer transformation service 1104, to enable the filter service 1004 to process the requests 1080.

Referring again to FIG. 10, in an example, the filter service 1004 comprises a filter chain service 1008 that processes the requests 1080, and renders the result 1084 for each request. In an example, the filter chain service 1008 comprises a certificate service 1060. The certificate service 1060 stores one or more certificates. For example, to ensure secure connections between the gateway service 124 and the filter service 1004, a security protocol may be established, e.g., to verify authenticity of the requests 1080 receives by the filter service 1004, and/or for signing the results 1084. In an example, mutual TLS (mTLS) may be used for securing communication between the gateway service 124 and the filter service 1004, although other security and/or encryption protocol may also be used. In an example, to implement the mTLS protocol (or another security and/or encryption protocol), the filter chain service 1008 has to have access to one or more security certificates. Accordingly, the certification plugin 1060 accesses a certificate storage service 1068 storing a plurality of digital certificates, wherein the certificate storage service 1068 may be external to the filter service 1004. In an example, the certification plugin 1060 accesses the certificate storage service 1068 through a certificate fetch service 1064 operating within the filter service 1004. The fetched certificates are usable to authenticate the requests 1080 received from the gateway service 124.

In an example, the filter chain service 1008 further comprises a chain of plugins, such as a schema validation plugin 1012, a sampling plugin 1030, an audit plugin 1040, a labelling and data classification plugin 1047, and/or an action plugin 1055. Although five such plugins (schema validation plugin 1012, sampling plugin 1030, audit plugin 1040, labelling and data classification plugin 1047, and action plugin 1055) are illustrated in FIG. 10, the filter chain service 1008 may include a different number of plugins as well.

The filter chain service 1008 comprises a series of processing operations performed by the corresponding series of plugins (e.g., schema validation plugin 1012, sampling plugin 1030, audit plugin 1040, labelling and data classification plugin 1047, and action plugin 1055), through which a request passes in a sequential order (although at least in part parallel processing of a request 1080 by two or more plugins may also be possible). In an example, each operation performed by a corresponding plugin in the filter chain service 1008 represents a filter that performs specific operations on an incoming request 1080 and/or performs transformations on the incoming request 1080. In an example, the filter chain service 1008 modularizes the processing of the requests 1080, allowing for flexibility and extensibility in handling various aspects of a lifecycle of processing the requests 1008. In an example, the filter chain service 1008 may perform tasks such as authentication (e.g., by the certificate service 1060), schema validation (e.g., by the schema validation plugin 1012), auditing (e.g., by the audit plugin 1040), sampling (e.g., by the sampling plugin 1030), data labelling and/or classification (e.g., by the labelling and data classification plugin 1047), and/or request modifications and decision rendering (e.g., by the action plugin 1055).

In an example, the plugins (e.g., schema validation plugin 1012, sampling plugin 1030, audit plugin 1040, labelling and data classification plugin 1047, and action plugin 1055) may be individual components within the filter chain service 1008, where each plugin is responsible for executing a corresponding operation in the processing flow of the filter chain service 1008. The plugins offer protocol-aware request inspections and/or modification tasks.

In an example, because the results 1084 may be for allowing or denying passage of a request to its intended destination, the inspection and filtering operation performed by the filter chain service 1008 may be in real or near-real time. For example, once a request is received at the gateway service 124, the filter service 1004 analyzes the request, based on which the gateway service 124 can allow or deny passage of the request to its intended destination. Thus, any operation performed by the filter service 1004 may be in real or near-real time, e.g., in order to reduce a latency experienced by the request at the gateway tenancy 120.

The schema validation plugin 1012, the sampling plugin 1030, the audit plugin 1040, the labelling and data classification plugin 1047, and the action plugin 1055 are illustrated to operate in a particular order in FIG. 10 (e.g., initially the schema validation plugin 1012, then the sampling plugin 1030, then the audit plugin 1040, and followed by the labelling and data classification plugin 1047, and finally the action plugin 1055). However, the order of operation of these plugins may vary from one example to the next. Furthermore, although these plugins are illustrated to process a request in a sequential order, a request may be processed at least in part in parallel by more than one plugin.

In an example, each of (or at least one or more of) the plugins (e.g., schema validation plugin 1012, sampling plugin 1030, audit plugin 1040, labelling and data classification plugin 1047, and action plugin 1055) may include one or more corresponding machine learning models and/or rule-based algorithms to perform corresponding operations of the plugins.

In an example, the schema validation plugin 1012 verifies and validates a schema of the requests 1080 comprising individual requests R1, R2, . . . , RN. For example, the schema validation plugin 1012 ensures that an incoming request (such as request R1) adheres to predefined and pre-agreed data structures and formats. For example, if a request includes patient record that is not supposed to include a social security number field, the schema validation plugin 1012 checks to see if the social security number field is present within the request. If the social security number field is present within the field and is populated with a social security number (e.g., is not blank), the schema validation plugin 1012 flags the request as being anomalous. In an example, the request may eventually be (i) denied passage to its intended destination, or (ii) may be modified to remove the social security number field or redact the social security number, and then allowed passage to its intended destination. In an example, the schema validation plugin 1012 enhances data integrity and reduces or minimizes a risk of malformed or malicious data. Thus, the schema validation plugin 1012 facilitates compliance with data standards, reduces vulnerabilities, and strengthens overall security by preventing unauthorized or inconsistent data.

For example, personally identifiable information (PII, e.g., which includes information that can be used to identify an individual, either directly or indirectly) within a request 1080 may be identified by the schema validation plugin 1012 (and/or by the labelling and data classification plugin 1047 described below). A request with PII data may be (i) denied passage to its intended destination, or (ii) may be modified to remove or redact the PII data, and then allowed passage to its intended destination.

In an example, the schema validation plugin 1012 may fetch allowed schema and data format from a schema storage service 1018, which may be stored outside the filter service 1004. The schema validation plugin 1012 may fetch allowed schema and data format from the schema storage service 1018, using a schema fetch service 1016. The schema from the schema storage service 1018 may arrive at the schema validation plugin 1012 using a push and/or a pull methodology, by the schema fetch service 1016 and/or the schema storage service 1018.

In an example, the schema validation plugin 1012 may include one or more machine learning (ML) models and/or rule-based algorithms to perform the corresponding schema validation operations. For example, autoencoders (such as variational auto encoders) may be used to identify normal or pre-agreed upon schema, and then may be used to identify anomalies within schema of one or more requests processed by the schema validation plugin 1012. Other ML models and/or rule-based algorithms may also be used for schema validation operations.

Figure 12:
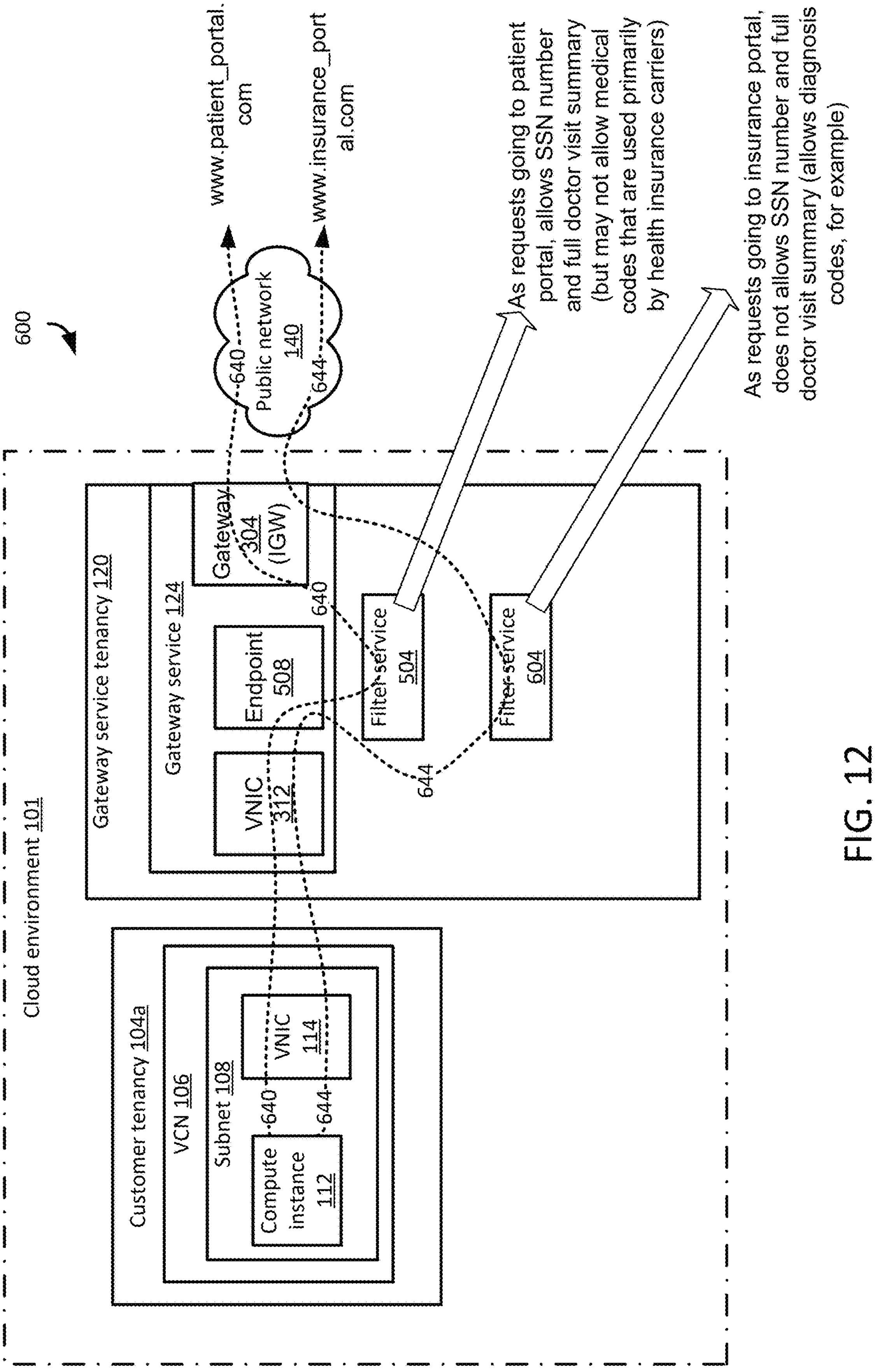
FIG. 12 illustrates two filter services providing different filtering services to different requests destined for different destinations.

FIG. 12 illustrates two filter services 504 and 604 providing different filtering services to different requests destined for different destinations. The setup of the system 600 of FIG. 12 has been described above with respect to FIG. 6. In the example of FIG. 12, the compute instance 112 transmits a first request 640 to a website www.patient_portal.com, which is a portal accessible by patients in a health care settings, where the patients may view and interact with their own health care records, including viewing after visit summary for their doctors. On the other hand, the compute instance 112 transmits a second request 644 to a website www.insurance_portal.com, which is a portal accessible by a health insurance carrier, where a healthcare organization uploads medical codes and bills for reimbursement by the health insurance carrier through this website www.insurance_portal.com.

As also described above with respect to FIG. 6, in FIG. 12, a first filter service 504 filters requests (such as the request 640) transmitted to the website www.patient_portal.com; and a second filter service 604 filters requests (such as the request 644) transmitted to the website www.insurance_portal.com. Each of the filter services 504, 604 may have a structure and operation at least in part similar to the filter service 1004 depicted in FIG. 10. However, in an example, the schema validation plugin in these two filter services 504 and 604 may look for different anomalous issues.

For example, request 640 transmitted to the patient portal may include social security number (SSN) of the patient and full doctor visit summary, but need not include medical codes that are assigned by the healthcare organization for insurance reimbursement purposes. Accordingly, the filter service 504 (such as a schema validation plugin 1012 within the filter service 504) processing the request 640 to the patient portal may allow SSN number and full doctor visit summary, but may not allow medical codes that are used primarily by health insurance carriers for insurance reimbursement purposes.

On the other hand, the request 644 transmitted to the insurance portal may not include sensitive PII information, such as social security number (SSN) of the patient. Furthermore, in an example, the request 644 also need not include full doctor visit summary. Rather, the request 644 may include medical and diagnosis codes assigned by the healthcare organization for insurance reimbursement purpose. Accordingly, the filter service 604 (such as a schema validation plugin 1012 within the filter service 604) processing the request 644 to the insurance portal may not allow SSN number and full doctor visit summary, but allow medical and diagnosis codes, for example.

Accordingly, in FIG. 12, two different filter services 504 and 604 processes the two different requests 640 and 644, respectively, and implements two different schema validation schemes. The above-described examples are implementation specific, and may vary from one example to the next.

Referring again to FIG. 10, the filter chain service 1008 further comprises a sampling plugin 1030 that samples one or more data packets of one or more requests 1080, or samples one or more requests 1080. For example, the sampling plugin 1030 may randomly or pseudo-randomly sample and store one or more requests 1080 (or at least sections of one or more requests 1080) for later analysis (such as offline analysis, offline data processing, and anomaly detection). In an example, the request sampling may be based on statistically defined rules. For example, statistical algorithms, ML models, and/or one or more rule-based algorithms may be used to randomly or pseudo-randomly select a subset of all requests 1080 processed by the filter chain service 1008, and the selected subset of requests may then be sampled by the sampling plugin 1030.

Because of the volume of traffic and the requirement for real or near-real time processing of the requests, in an example, it may not be possible to fully and thoroughly inspect all requests passing the filter service 1004. Accordingly, one or more requests are sampled for later analysis. Sampling a certain percentage of the pass-through requests 1080 traffic enables data analysts to work with a relatively small and manageable amount of sampled requests that represents the population as a fair representation of the data collection, for the purposes of building analytical models and produce relatively accurate findings. In an example, a 2-stage time based sampling logic or another statistical model may be used to sample a percentage of the requests 1080, and store such sampled requests to the sampling local storage 1034, for the sample upload service 1036 to aggregate and upload into a designated object store (e.g., the sample storage service 1038). Thus, the samples requests may be initially and locally stored within a sampling local storage 1034 within the filter service 1004, and periodically or continuously uploaded to a sample storage service 1038 (which may be external to the filter service 1004) by a sample upload service 1036 operating within the filter service 1004.

As illustrated in FIG. 10, the filter chain service 1008 further comprises an audit plugin 1040. The audit plugin 1040 audits and logs data and object structures. For example, the audited data may define possible fields identified by any preceding plugins. The audited data may be written to an audit local storage 1042, and later uploaded to an audit result storage service 1046 (e.g., by an audit upload service 1044), where the audit result storage service 1046 may be outside the filter service 1004. In an example, the audit plugin 1040 may include one or more ML models and/or rule-based algorithms to identify data and/or metadata to be audited by the audit plugin 1040.

In an example, metadata and extracted fields of requests 1080 may be audited and logged by the audit plugin 1040. Examples of information logged by the audit plugin 1040 includes one or more of a timestamp of a request, a customer tenancy from which the request originated or to which the request is destined for, identity of one or more user entity involved with the request (such as a user entity transmitting the request, or a user entity receiving the request), one or more actions to be undertaken based on the request (such as creation of a compute instance, based on a request to create a compute instance), a status of a schema validation filtering (such as passed the schema validation filtering, failed the schema validation filtering, schema validation filtering was bypassed, or request to be modified based on the schema validation filtering), an IP address of a source of the request, an IP address of a destination of the request, a destination network port of the request, a network path the request has so far undertaken and/or will undertake to reach its intended destination, any universal resource locator (URL) accessed by a plugin to filter the request, a payload size of a payload of the request, a user agent associated with the request, a client software version used to generate the request, any proxy action to be acted on the request (such as if the proxy blocked the request), any security policy and/or schema validation policy that the request has or may have violated, one or more protocols associated with the request (such as an incoming protocol of the request and/or a subsequent outgoing protocol of the request), whether the schema validation plugin 1012 is in activate mode or blocking mode while processing the request, one or more additional contextual information associated with the request, outcome of filtering the request by one or more plugins of the filter chain service 1998, any request redaction status (e.g., if a request is at least in part modified or redacted), schema validation status, and/or one or more other relevant information associated with the request.

As illustrated in FIG. 10, the filter chain service 1008 further comprises a labelling and data classification plugin 1047. In an example, the labelling and data classification plugin 1047 assigns labels to requests in real or near-real time (or in an offline manner) and/or classifies requests. For example, the assigned labels and classification may identify a request to be anomalous, or identify a section of a request to be anomalous. Additionally or alternatively, an anomalous issue associated with a request may be identified. Such labelling and/or classification of requests enable dynamic and continuous annotation of incoming requests. In an example, this allows one or more ML models operating within the filter chain service 1008 (such as ML models within the schema validation plugin 1012) to adapt in real-time to evolving patterns and trends. In an example, this results in an improved model accuracy and model responsiveness. In an example, such labelling and/or classification offers prompt (such as in real or near-real time) identification and categorization of sensitive information and anomalous requests, enabling proactive threat detection, data protection, and regulatory compliance.

In an example, in addition to or instead of labeling and classifying information from the incoming request, the labelling and data classification plugin 1047 may also add labels and classifications to an incoming request, e.g., in the form of metadata added to the request. Thus, labelled requests may be beneficial in downstream processing of requests, e.g., by enabling one or more downstream systems to act directly on labeled or classified requests. Merely as an example, the labelling and data classification plugin 1047 may label the requests prior to the sampling plugin 1030 sampling the request (e.g., the flow of the requests through the filter chain service 1008 may be different from that illustrated in FIG. 10, where the labelling and data classification plugin 1047 labels prior to the sampling plugin 1030 sampling one or more requests). Accordingly, the labelled requests, as sampled by the sampling plugin 1030, may be processed in a more streamlined manner for offline analysis. In another use case scenario, if the labelling and data classification plugin 1047 labels the requests, any subsequent plugin(s) of the filter chain service 1008 may be able to interpret and utilize these labels for processing of the requests. Again, in this example, the labelling and data classification plugin 1047 may process requests prior to one or more other plugins of the filter chain service 1008 processing the requests (e.g., the sequence of the plugins in FIG. 10 may be altered).

In an example, the filter chain service 1008 further includes an action plugin 1055 to undertake one or more actions for individual requests processed by the filter chain plugin 1008. For example, if no anomalous issue is identified with a request (e.g., by the one or more plugins of the filter chain service 1008), the action plugin 1005 renders a decision 1088 to the gateway service 124 to allow passage of the request to its intended destination.

In another example, if an anomalous issue is identified with a request (e.g., by the one or more plugins of the filter chain service 1008), the action plugin 1005 renders a decision 1088 to the gateway service 124 to deny passage of the request to its intended destination.

In yet example, if an anomalous issue is identified with a request (e.g., by the one or more plugins of the filter chain service 1008), the action plugin 1005 modifies one or more packets 1092 of the request, and then renders a decision 1088 to the gateway service 124 to allow passage of the modified packets of the request to their intended destination.

In an example, the filter service 1004, including the plugins 1012, . . . , 1055 may be operated and/or configured by personnel of the assurance administrator. The filter service 1004, along with the gateway service 124, provides software assurance for the customer tenancy 104*a* described above. For example, requests (such as all requests) inbound or outbound of the customer tenancy 104*a* are processed by the gateway service 124 and the filter service 1004, thereby providing software assurance for the customer tenancy 104*a*.

In an example, because of the lack of trust between the assurance administrator and the cloud customer renting the customer tenancy 104*a*, the assurance administrator may not rely on the cloud customer to configure, operate, or modify operations of the filter service 1004. Accordingly, in an example, users and administrators of the customer tenancy may not have privileges to configure settings of the filter service 1004, or delete or alter operations of the filter service 1004. For example, users and/or administrators of the assurance administrator and/or the cloud provider may have privileges to configure settings of the filter service 1004, or delete or alter operations of the filter service 1004.

Figure 13:
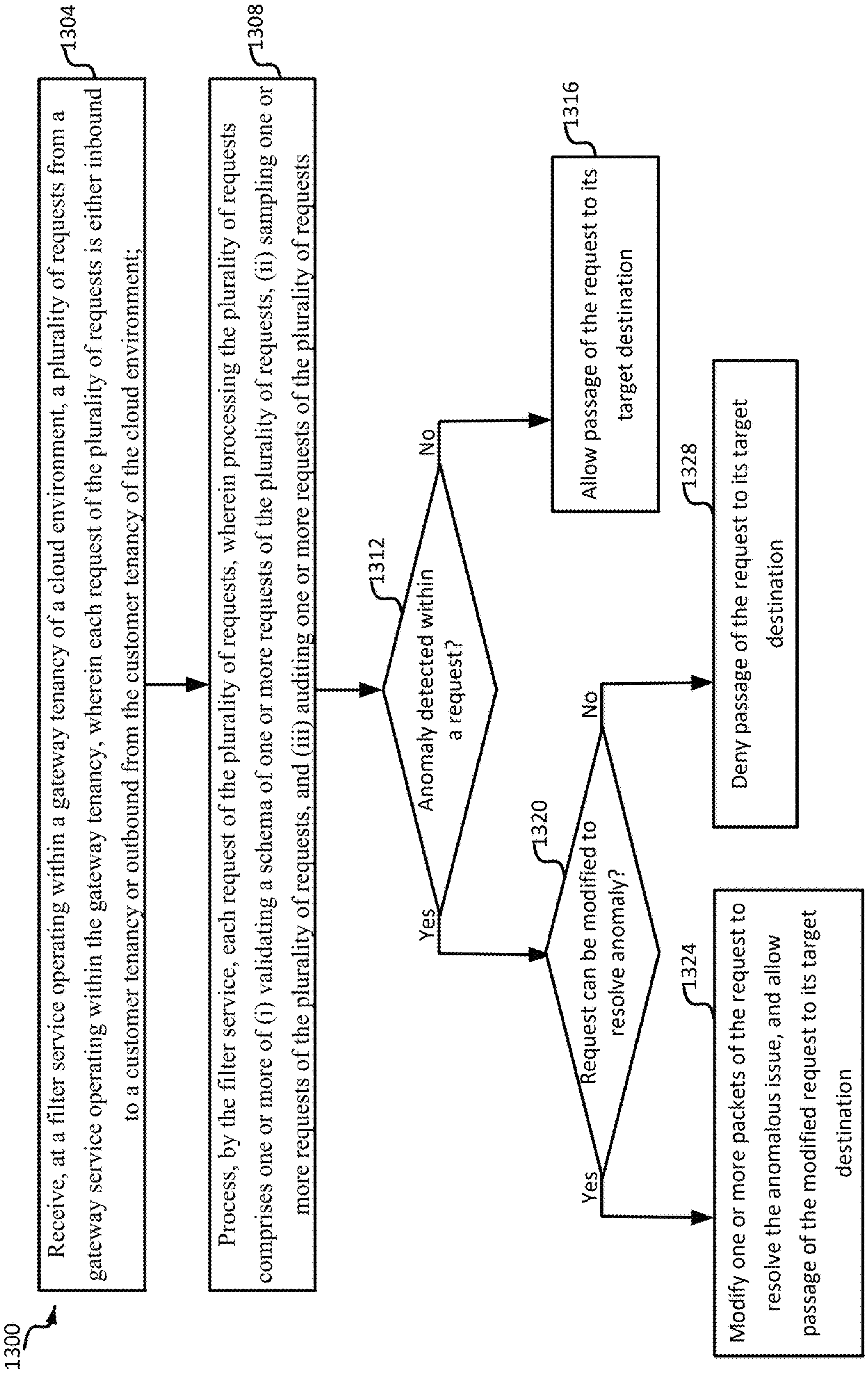
FIG. 13 illustrates a flowchart depicting a method of operating a filter service in conjunction with a gateway service.

FIG. 13 illustrates a flowchart depicting a method 1300 of operating a filter service in conjunction with a gateway service. The method 1300 may be performed by any of the filter services described herein.

At 1304, a plurality of requests is received at a filter service operating within a gateway tenancy of a cloud environment. The plurality of requests is received from a gateway service operating within the gateway tenancy. In an example, each request of the plurality of requests is either inbound to a customer tenancy or outbound from the customer tenancy of the cloud environment. For example, all requests inbound to the customer tenancy or outbound from the customer tenancy are processed by the filter service. In an example, each request of the plurality of requests is received from the gateway service at a transport layer (layer 4) or at an application layer (layer 7) of a protocol stack, as described above with respect to FIGS. 10 and 11.

The method 1300 proceeds from 1304 to 1308. At 1308, the filter service processes each request of the plurality of requests, wherein processing the plurality of requests comprises one or more of (i) validating a schema of one or more requests of the plurality of requests, (ii) sampling one or more requests of the plurality of requests, and (iii) auditing one or more requests of the plurality of requests, as described above with respect to FIG. 10.

The method 1300 proceeds from 1308 to 1312. At 1312, a determination is made (e.g., by the action plugin 1055 and/or the schema validation plugin 1012) as to whether any anomaly was detected within a request.

If "No" at 1312 (e.gh., no anomaly was detected), the method 1300 proceeds from 1312 to 1316. At 1316, the request is allowed passage to its target destination. For example, the action plugin 1055 renders a decision 1084 to the gateway service 124, to allow passage of the request to its target destination.

However, if "Yes" at 1312 (e.g., an anomaly was detected), the method 1300 proceeds from 1312 to 1320. At 1320, a determination is made (e.g., by the action plugin 1055 and/or the schema validation plugin 1012) as to whether the request can be modified to resolve the detected anomaly. Whether the request can be modified to resolve the detected anomaly may be based on a type of the anomaly detected, and/or a settings of the filter service.

If "No" at 1320 (e.g., the request cannot be modified to resolve the detected anomaly), the method 1300 proceeds from 1320 to 1328. At 1328, the request is denied passage to its target destination. For example, the action plugin 1055 renders a decision 1084 to the gateway service 124, to deny passage of the request to its target destination.

If "Yes" at 1320 (e.g., the request can be modified to resolve the detected anomaly), the method 1300 proceeds from 1320 to 1324. At 1324, one or more packets of the request are modified (e.g., by the action plugin 1055, or by the schema validation plugin 1012, or by the gateway service 124) to resolve the anomalous issue, and the modified request is allowed passage to its target destination.

Computer System Architecture

Figure 14:
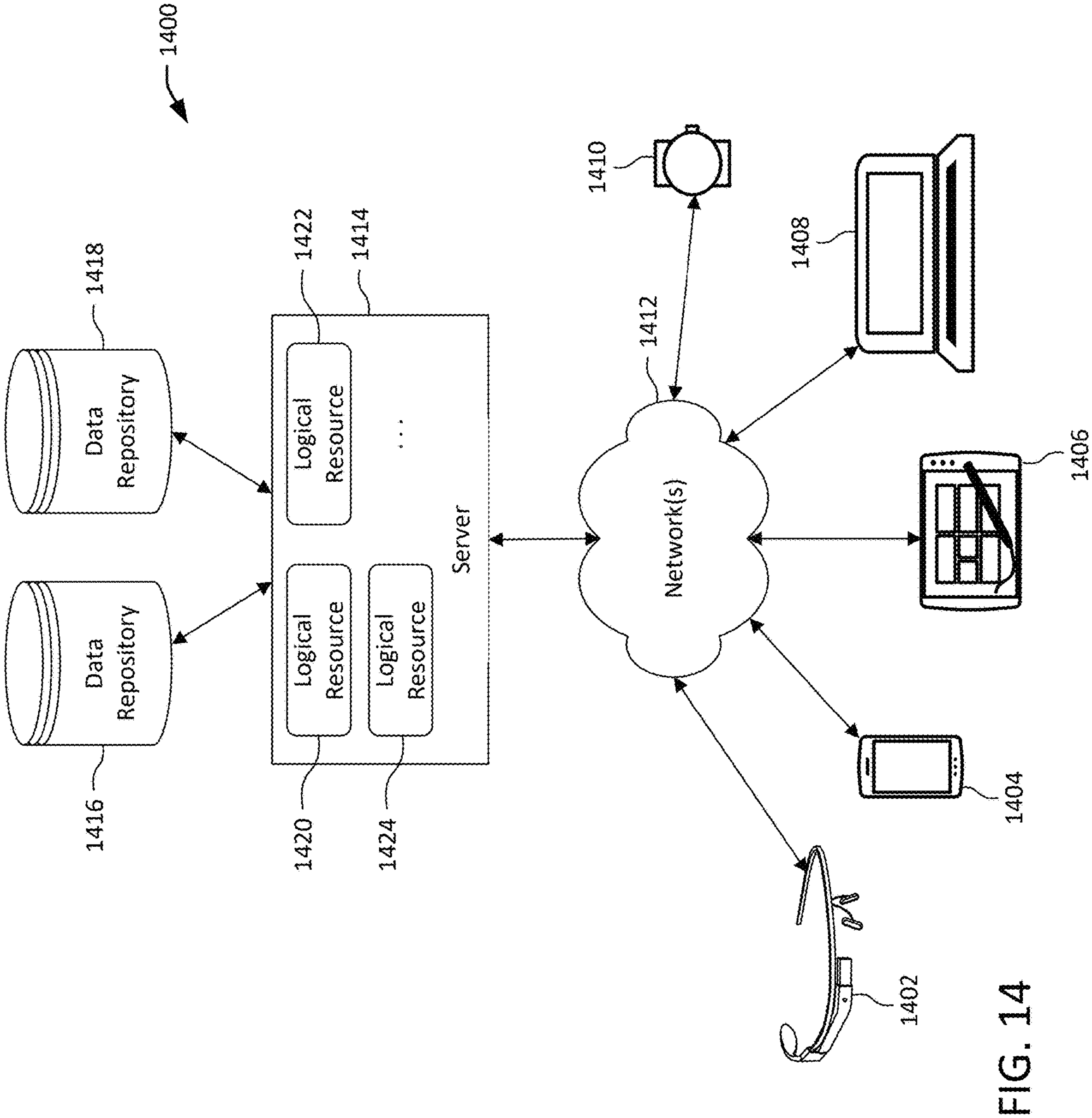
FIG. 14 depicts a simplified diagram of a distributed system for implementing certain aspects.

FIG. 14 depicts a simplified diagram of a distributed system 1400 for implementing an embodiment. In the illustrated embodiment, distributed system 1400 includes one or more client computing devices 1402, 1404, 1406, 1408, and/or 1410 coupled to a server 1414 via one or more communication networks 1412. Clients computing devices 1402, 1404, 1406, 1408, and/or 1410 may be configured to execute one or more applications.

In various aspects, server 1414 may be adapted to run one or more services or software applications that enable techniques for implementing a generic gateway service for software assurance within a cloud environment and/or implementing a filter service within a gateway tenancy for software assurance within the cloud environment. In certain aspects, server 1414 may also provide other services or software applications that can include non-virtual and virtual environments. In some aspects, these services may be offered as web-based or cloud services, such as under a Software as a Service (SaaS) model to the users of client computing devices 1402, 1404, 1406, 1408, and/or 1410. Users operating client computing devices 1402, 1404, 1406, 1408, and/or 1410 may in turn utilize one or more client applications to interact with server 1414 to utilize the services provided by these components.

In the configuration depicted in FIG. 14, server 1414 may include one or more components 1420, 1422 and 1424 that implement the functions performed by server 1414. These components may include software components that may be executed by one or more processors, hardware components, or combinations thereof. It should be appreciated that various different system configurations are possible, which may be different from distributed system 1400. The embodiment shown in FIG. 14 is thus one example of a distributed system for implementing an embodiment system and is not intended to be limiting.

Users may use client computing devices 1402, 1404, 1406, 1408, and/or 1410 for techniques for implementing a generic gateway service for software assurance within a cloud environment and/or implementing a filter service within a gateway tenancy for software assurance within the cloud environment, in accordance with the teachings of this disclosure. A client device may provide an interface that enables a user of the client device to interact with the client device. The client device may also output information to the user via this interface. Although FIG. 14 depicts only five client computing devices, any number of client computing devices may be supported.

The client devices may include various types of computing systems such as smart phones or other portable handheld devices, general purpose computers such as personal computers and laptops, workstation computers, personal assistant devices, smart watches, smart glasses, or other wearable devices, equipment firmware, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux® or Linux-like operating systems such as Oracle® Linux and Google Chrome® OS) including various mobile operating systems (e.g., Microsoft Windows Mobile®, iOS®, Windows Phone®, Android®, HarmonyOS®, Tizen®, KaiOS®, Sailfish® OS, Ubuntu® Touch, CalyxOS®). Portable handheld devices may include cellular phones, smartphones, (e.g., an iPhone®), tablets (e.g., iPad®), and the like. Virtual personal assistants such as Amazon® Alexa®, Google® Assistant, Microsoft® Cortana®, Apple® Siri®, and others may be implemented on devices with a microphone and/or camera to receive user or environmental inputs, as well as a speaker and/or display to respond to the inputs. Wearable devices may include Apple® Watch, Samsung Galaxy® Watch, Meta Quest®, Ray-Ban® Meta® smart glasses, Snap® Spectacles, and other devices. Gaming systems may include various handheld gaming devices, Internet-enabled gaming devices (e.g., a Microsoft Xbox® gaming console with or without a Kinect® gesture input device, Sony PlayStation® system, Nintendo Switch®, and other devices), and the like. The client devices may be capable of executing various different applications such as various Internet-related apps, communication applications (e.g., e-mail applications, short message service (SMS) applications) and may use various communication protocols.

Network(s) 1412 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 1412 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 1414 may be composed of one or more general purpose computers, specialized server computers (including, by way of example, PC (personal computer) servers, UNIX® servers, LINIX® servers, mid-range servers, mainframe computers, rack-mounted servers, etc.), server farms, server clusters, a Real Application Cluster (RAC), database servers, or any other appropriate arrangement and/or combination. Server 1414 can include one or more virtual machines running virtual operating systems, or other computing architectures involving virtualization such as one or more flexible pools of logical storage devices that can be virtualized to maintain virtual storage devices for the server. In various aspects, server 1414 may be adapted to run one or more services or software applications that provide the functionality described in the foregoing disclosure.

The computing systems in server 1414 may run one or more operating systems including any of those discussed above, as well as any commercially available server operating system. Server 1414 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, SAP®, Amazon®, Sybase®, IBM® (International Business Machines), and the like.

In some implementations, server 1414 may include one or more applications to analyze and consolidate data feeds and/or event updates received from users of client computing devices 1402, 1404, 1406, 1408, and/or 1410. As an example, data feeds and/or event updates may include, but are not limited to, blog feeds, Threads® feeds, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1414 may also include one or more applications to display the data feeds and/or real-time events via one or more display devices of client computing devices 1402, 1404, 1406, 1408, and/or 1410.

Distributed system 1400 may also include one or more data repositories 1416, 1418. These data repositories may be used to store data and other information in certain aspects. For example, one or more of the data repositories 1416, 1418 may be used to store information for techniques for implementing a generic gateway service for software assurance within a cloud environment and/or implementing a filter service within a gateway tenancy for software assurance within the cloud environment. Data repositories 1416, 1418 may reside in a variety of locations. For example, a data repository used by server 1414 may be local to server 1414 or may be remote from server 1414 and in communication with server 1414 via a network-based or dedicated connection. Data repositories 1416, 1418 may be of different types. In certain aspects, a data repository used by server 1414 may be a database, for example, a relational database, a container database, an Exadata® storage device, or other data storage and retrieval tool such as databases provided by Oracle Corporation® and other vendors. One or more of these databases may be adapted to enable storage, update, and retrieval of data to and from the database in response to structured query language (SQL)-formatted commands.

In certain aspects, one or more of data repositories 1416, 1418 may also be used by applications to store application data. The data repositories used by applications may be of different types such as, for example, a key-value store repository, an object store repository, or a general storage repository supported by a file system.

In one embodiment, server 1414 is part of a cloud-based system environment in which various services may be offered as cloud services, for a single tenant or for multiple tenants where data, requests, and other information specific to the tenant are kept private from each tenant. In the cloud-based system environment, multiple servers may communicate with each other to perform the work requested by client devices from the same or multiple tenants. The servers communicate on a cloud-side network that is not accessible to the client devices in order to perform the requested services and keep tenant data confidential from other tenants.

Figure 15:
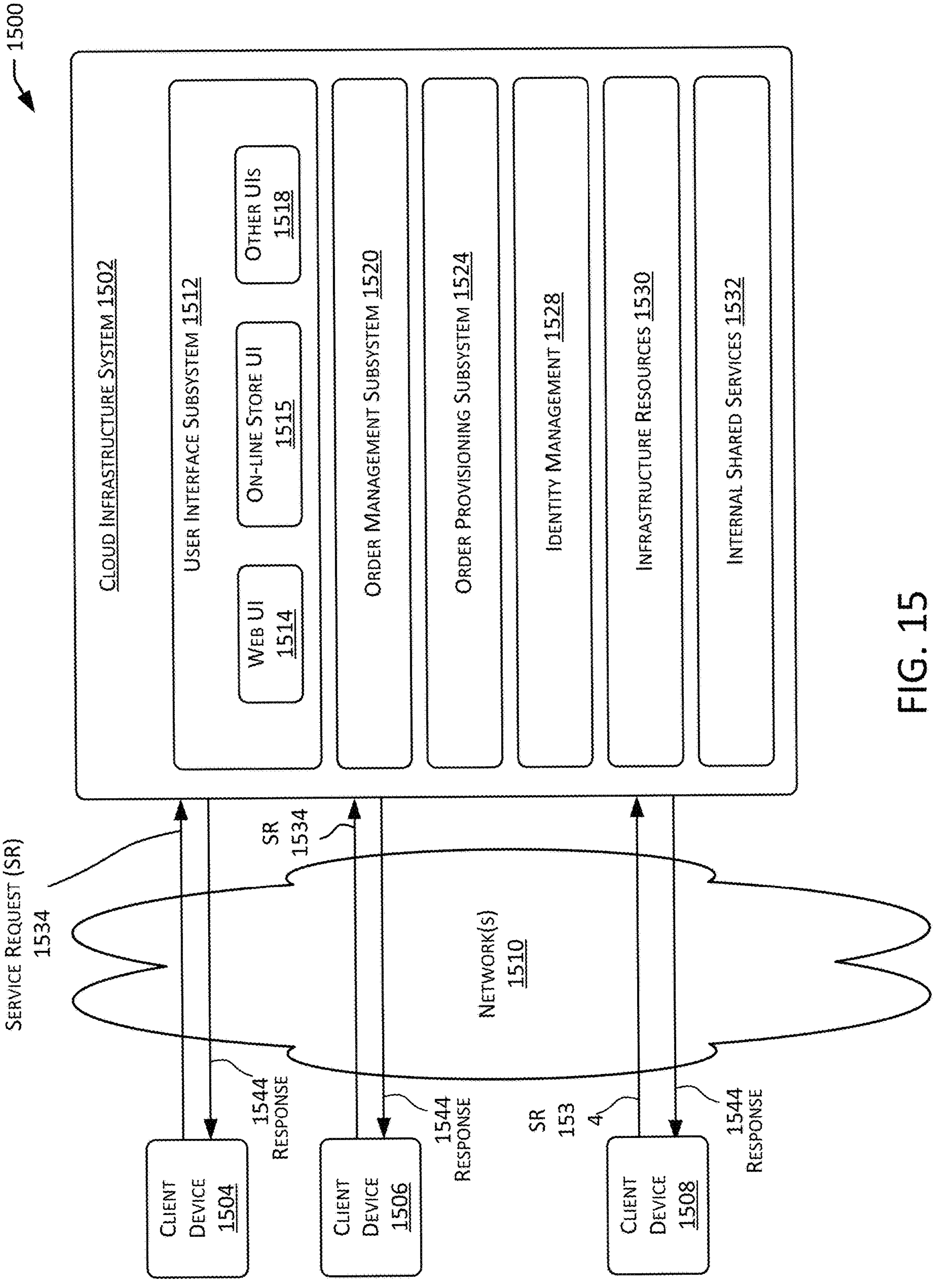
FIG. 15 is a simplified block diagram of one or more components of a system environment by which services provided by one or more components of an embodiment system may be offered as cloud services, in accordance with certain aspects.

FIG. 15 is a simplified block diagram of a cloud-based system environment in which techniques for implementing a generic gateway service for software assurance within a cloud environment and/or implementing a filter service within a gateway tenancy for software assurance within the cloud environment are disclosed, in accordance with certain aspects. In the embodiment depicted in FIG. 15, cloud infrastructure system 1502 may provide one or more cloud services that may be requested by users using one or more client computing devices 1504, 1506, and 1508. Cloud infrastructure system 1502 may comprise one or more computers and/or servers that may include those described above for server 1414. The computers in cloud infrastructure system 1502 may be organized as general purpose computers, specialized server computers, server farms, server clusters, or any other appropriate arrangement and/or combination.

Network(s) 1510 may facilitate communication and exchange of data between clients 1504, 1506, and 1508 and cloud infrastructure system 1502. Network(s) 1510 may include one or more networks. The networks may be of the same or different types. Network(s) 1510 may support one or more communication protocols, including wired and/or wireless protocols, for facilitating the communications.

The embodiment depicted in FIG. 15 is only one example of a cloud infrastructure system and is not intended to be limiting. It should be appreciated that, in some other aspects, cloud infrastructure system 1502 may have more or fewer components than those depicted in FIG. 15, may combine two or more components, or may have a different configuration or arrangement of components. For example, although FIG. 15 depicts three client computing devices, any number of client computing devices may be supported in alternative aspects.

The term cloud service is generally used to refer to a service that is made available to users on demand and via a communication network such as the Internet by systems (e.g., cloud infrastructure system 1502) of a service provider. Typically, in a public cloud environment, servers and systems that make up the cloud service provider's system are different from the cloud customer's ("tenant's") own on-premise servers and systems. The cloud service provider's systems are managed by the cloud service provider. Tenants can thus avail themselves of cloud services provided by a cloud service provider without having to purchase separate licenses, support, or hardware and software resources for the services. For example, a cloud service provider's system may host an application, and a user may, via a network 1510 (e.g., the Internet), on demand, order and use the application without the user having to buy infrastructure resources for executing the application. Cloud services are designed to provide easy, scalable access to applications, resources, and services. Several providers offer cloud services. For example, several cloud services are offered by Oracle Corporation®, such as database services, middleware services, application services, and others.

In certain aspects, cloud infrastructure system 1502 may provide one or more cloud services using different models such as under a Software as a Service (SaaS) model, a Platform as a Service (PaaS) model, an Infrastructure as a Service (IaaS) model, a Data as a Service (DaaS) model, and others, including hybrid service models. Cloud infrastructure system 1502 may include a suite of databases, middleware, applications, and/or other resources that enable provision of the various cloud services.

A SaaS model enables an application or software to be delivered to a tenant's client device over a communication network like the Internet, as a service, without the tenant having to buy the hardware or software for the underlying application. For example, a SaaS model may be used to provide tenants access to on-demand applications that are hosted by cloud infrastructure system 1502. Examples of SaaS services provided by Oracle Corporation® include, without limitation, various services for human resources/capital management, client relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware, and networking resources) to a tenant as a cloud service to provide elastic compute and storage capabilities. Various IaaS services are provided by Oracle Corporation®.

A PaaS model is generally used to provide, as a service, platform and environment resources that enable tenants to develop, run, and manage applications and services without the tenant having to procure, build, or maintain such resources. Examples of PaaS services provided by Oracle Corporation® include, without limitation, Oracle Database Cloud Service (DBCS), Oracle Java Cloud Service (JCS), data management cloud service, various application development solutions services, and others.

A DaaS model is generally used to provide data as a service. Datasets may searched, combined, summarized, and downloaded or placed into use between applications. For example, user profile data may be updated by one application and provided to another application. As another example, summaries of user profile information generated based on a dataset may be used to enrich another dataset.

Cloud services are generally provided on an on-demand self-service basis, subscription-based, elastically scalable, reliable, highly available, and secure manner. For example, a tenant, via a subscription order, may order one or more services provided by cloud infrastructure system 1502. Cloud infrastructure system 1502 then performs processing to provide the services requested in the tenant's subscription order. Cloud infrastructure system 1502 may be configured to provide one or even multiple cloud services.

Cloud infrastructure system 1502 may provide the cloud services via different deployment models. In a public cloud model, cloud infrastructure system 1502 may be owned by a third party cloud services provider and the cloud services are offered to any general public tenant, where the tenant can be an individual or an enterprise. In certain other aspects, under a private cloud model, cloud infrastructure system 1502 may be operated within an organization (e.g., within an enterprise organization) and services provided to clients that are within the organization. For example, the clients may be various departments or employees or other individuals of departments of an enterprise such as the Human Resources department, the Payroll department, etc., or other individuals of the enterprise. In certain other aspects, under a community cloud model, the cloud infrastructure system 1502 and the services provided may be shared by several organizations in a related community. Various other models such as hybrids of the above mentioned models may also be used.

Client computing devices 1504, 1506, and 1508 may be of different types (such as devices 1402, 1404, 1406, and 1408 depicted in FIG. 14) and may be capable of operating one or more client applications. A user may use a client device to interact with cloud infrastructure system 1502, such as to request a service provided by cloud infrastructure system 1502.

In some aspects, the processing performed by cloud infrastructure system 1502 for providing chatbot services may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 1502 for determining the intent of an utterance. The data used for this analysis may include structured data (e.g., data stored in a database or structured according to a structured model) and/or unstructured data (e.g., data blobs (binary large objects)).

As depicted in the embodiment in FIG. 15, cloud infrastructure system 1502 may include infrastructure resources 1530 that are utilized for facilitating the provision of various cloud services offered by cloud infrastructure system 1502. Infrastructure resources 1530 may include, for example, processing resources, storage or memory resources, networking resources, and the like.

In certain aspects, to facilitate efficient provisioning of these resources for supporting the various cloud services provided by cloud infrastructure system 1502 for different tenants, the resources may be bundled into sets of resources or resource modules (also referred to as "pods"). Each resource module or pod may comprise a pre-integrated and optimized combination of resources of one or more types. In certain aspects, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 1502 may itself internally use services 1532 that are shared by different components of cloud infrastructure system 1502 and which facilitate the provisioning of services by cloud infrastructure system 1502. These internal shared services may include, without limitation, a security and identity service, an integration service, an enterprise repository service, an enterprise manager service, a virus scanning and whitelist service, a high availability, backup and recovery service, service for enabling cloud support, an email service, a notification service, a file transfer service, and the like.

Cloud infrastructure system 1502 may comprise multiple subsystems. These subsystems may be implemented in software, or hardware, or combinations thereof. As depicted in FIG. 15, the subsystems may include a user interface subsystem 1512 that enables users of cloud infrastructure system 1502 to interact with cloud infrastructure system 1502. User interface subsystem 1512 may include various different interfaces such as a web interface 1514, an online store interface 1516 where cloud services provided by cloud infrastructure system 1502 are advertised and are purchasable by a consumer, and other interfaces 1518. For example, a tenant may, using a client device, request (service request 1534) one or more services provided by cloud infrastructure system 1502 using one or more of interfaces 1514, 1516, and 1518. For example, a tenant may access the online store, browse cloud services offered by cloud infrastructure system 1502, and place a subscription order for one or more services offered by cloud infrastructure system 1502 that the tenant wishes to subscribe to. The service request may include information identifying the tenant and one or more services that the tenant desires to subscribe to. For example, a tenant may place a subscription order for a chatbot related service offered by cloud infrastructure system 1502. As part of the order, the client may provide information identifying the input (e.g. utterances).

In certain aspects, such as the embodiment depicted in FIG. 15, cloud infrastructure system 1502 may comprise an order management subsystem (OMS) 1520 that is configured to process the new order. As part of this processing, OMS 1520 may be configured to: create an account for the tenant, if not done already; receive billing and/or accounting information from the tenant that is to be used for billing the tenant for providing the requested service to the tenant; verify the tenant information; upon verification, book the order for the tenant; and orchestrate various workflows to prepare the order for provisioning.

Once properly validated, OMS 1520 may then invoke the order provisioning subsystem (OPS) 1524 that is configured to provision resources for the order including processing, memory, and networking resources. The provisioning may include allocating resources for the order and configuring the resources to facilitate the service requested by the tenant order. The manner in which resources are provisioned for an order and the type of the provisioned resources may depend upon the type of cloud service that has been ordered by the tenant. For example, according to one workflow, OPS 1524 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting tenant for providing the requested service.

Cloud infrastructure system 1502 may send a response or notification 1544 to the requesting tenant to indicate when the requested service is now ready for use. In some instances, information (e.g., a link) may be sent to the tenant that enables the tenant to start using and availing the benefits of the requested services.

Cloud infrastructure system 1502 may provide services to multiple tenants. For each tenant, cloud infrastructure system 1502 is responsible for managing information related to one or more subscription orders received from the tenant, maintaining tenant data related to the orders, and providing the requested services to the tenant or clients of the tenant. Cloud infrastructure system 1502 may also collect usage statistics regarding a tenant's use of subscribed services. For example, statistics may be collected for the amount of storage used, the amount of data transferred, the number of users, and the amount of system up time and system down time, and the like. This usage information may be used to bill the tenant. Billing may be done, for example, on a monthly cycle.

Cloud infrastructure system 1502 may provide services to multiple tenants in parallel. Cloud infrastructure system 1502 may store information for these tenants, including possibly proprietary information. In certain aspects, cloud infrastructure system 1502 comprises an identity management subsystem (IMS) 1528 that is configured to manage tenant's information and provide the separation of the managed information such that information related to one tenant is not accessible by another tenant. IMS 1528 may be configured to provide various security-related services such as identity services, such as information access management, authentication and authorization services, services for managing tenant identities and roles and related capabilities, and the like.

Figure 16:
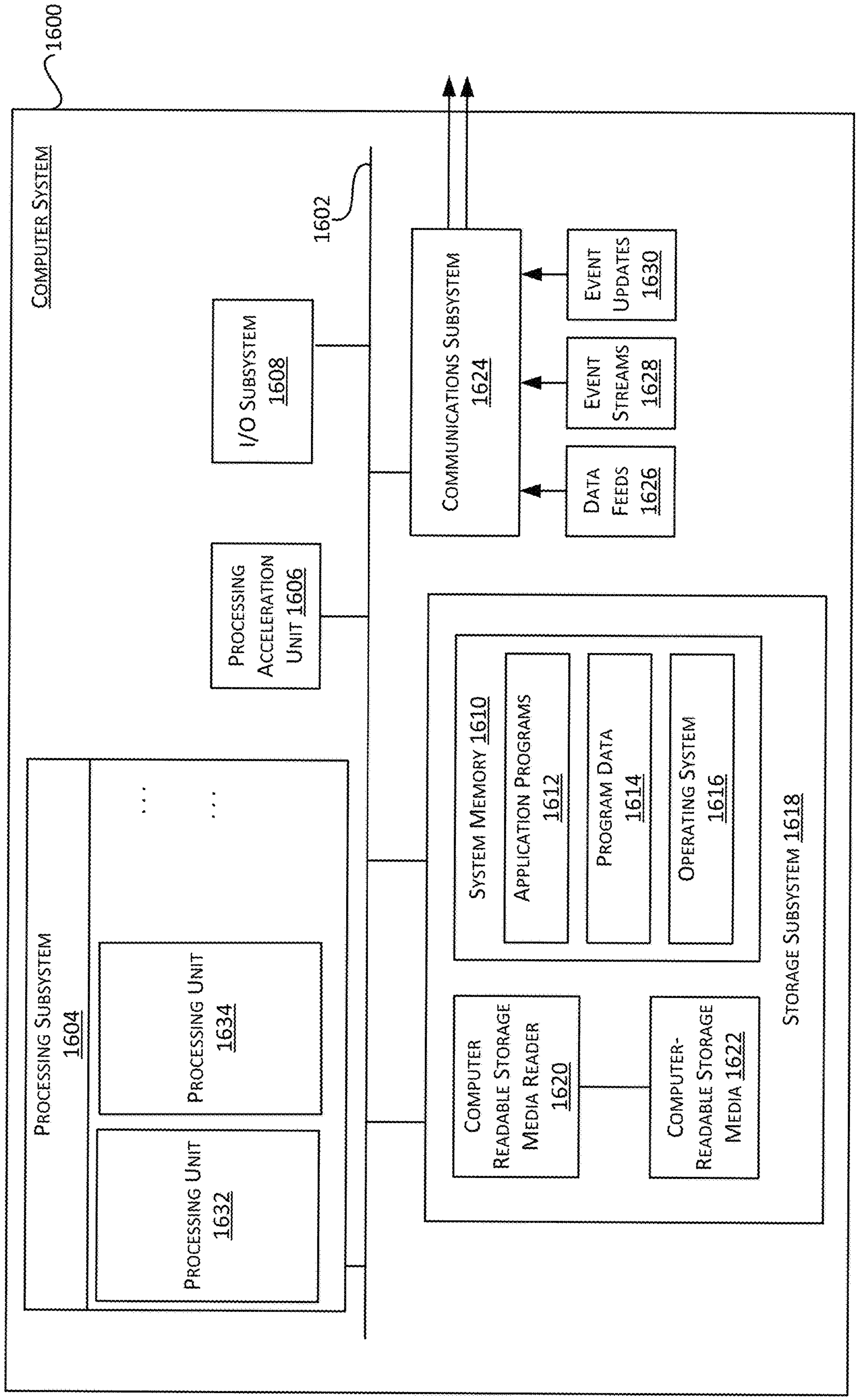
FIG. 16 illustrates an example computer system that may be used to implement certain aspects.

FIG. 16 illustrates an exemplary computer system 1600 that may be used to implement certain aspects. As shown in FIG. 16, computer system 1600 includes various subsystems including a processing subsystem 1604 that communicates with a number of other subsystems via a bus subsystem 1602. These other subsystems may include a processing acceleration unit 1606, an I/O subsystem 1608, a storage subsystem 1618, and a communications subsystem 1624. Storage subsystem 1618 may include non-transitory computer-readable storage media including storage media 1622 and a system memory 1610.

Bus subsystem 1602 provides a mechanism for letting the various components and subsystems of computer system 1600 communicate with each other as intended. Although bus subsystem 1602 is shown schematically as a single bus, alternative aspects of the bus subsystem may utilize multiple buses. Bus subsystem 1602 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1604 controls the operation of computer system 1600 and may comprise one or more processors, application specific integrated circuits (ASICs), or field programmable gate arrays (FPGAs). The processors may be single core or multicore processors. The processing resources of computer system 1600 can be organized into one or more processing units 1632, 1634, etc. A processing unit may include one or more processors, one or more cores from the same or different processors, a combination of cores and processors, or other combinations of cores and processors. In some aspects, processing subsystem 1604 can include one or more special purpose co-processors such as graphics processors, digital signal processors (DSPs), or the like. In some aspects, some or all of the processing units of processing subsystem 1604 can be implemented using customized circuits, such as application specific integrated circuits (ASICs), or field programmable gate arrays (FPGAs).

In some aspects, the processing units in processing subsystem 1604 can execute instructions stored in system memory 1610 or on computer readable storage media 1622. In various aspects, the processing units can execute a variety of programs or code instructions and can maintain multiple concurrently executing programs or processes. At any given time, some or all of the program code to be executed can be resident in system memory 1610 and/or on computer-readable storage media 1622 including potentially on one or more storage devices. Through suitable programming, processing subsystem 1604 can provide various functionalities described above. In instances where computer system 1600 is executing one or more virtual machines, one or more processing units may be allocated to each virtual machine.

In certain aspects, a processing acceleration unit 1606 may optionally be provided for performing customized processing or for off-loading some of the processing performed by processing subsystem 1604 so as to accelerate the overall processing performed by computer system 1600.

I/O subsystem 1608 may include devices and mechanisms for inputting information to computer system 1600 and/or for outputting information from or via computer system 1600. In general, use of the term input device is intended to include all possible types of devices and mechanisms for inputting information to computer system 1600. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Meta Quest® controller, Microsoft Kinect® motion sensor, the Microsoft Xbox® 360 game controller, or devices that provide an interface for receiving input using gestures and spoken commands. User interface input devices may also include eye gesture recognition devices such as a blink detector that detects eye activity (e.g., "blinking" while taking pictures and/or making a menu selection) from users and transforms the eye gestures as inputs to an input device. Additionally, user interface input devices may include voice recognition sensing devices that enable users to interact with voice recognition systems (e.g., Siri® navigator or Amazon Alexa®) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, QR code readers, barcode readers, 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments, and the like.

In general, use of the term output device is intended to include all possible types of devices and mechanisms for outputting information from computer system 1600 to a user or other computer. User interface output devices may include a display subsystem, indicator lights, or non-visual displays such as audio output devices, etc. The display subsystem may be any device for outputting a digital picture. Example display devices include flat panel display devices such as those using a light emitting diode (LED) display, a liquid crystal display (LCD) or plasma display, a projection device, a touch screen, a desktop or laptop computer monitor, and the like. As another example, wearable display devices such as Meta Quest® or Microsoft HoloLens® may be mounted to the user for displaying information. User interface output devices may include, without limitation, a variety of display devices that visually convey text, graphics, and audio/video information such as monitors, printers, speakers, headphones, automotive navigation systems, plotters, voice output devices, and modems.

Storage subsystem 1618 provides a repository or data store for storing information and data that is used by computer system 1600. Storage subsystem 1618 provides a tangible non-transitory computer-readable storage medium for storing the basic programming and data constructs that provide the functionality of some aspects. Storage subsystem 1618 may store software (e.g., programs, code modules, instructions) that when executed by processing subsystem 1604 provides the functionality described above. The software may be executed by one or more processing units of processing subsystem 1604. Storage subsystem 1618 may also provide a repository for storing data used in accordance with the teachings of this disclosure.

Storage subsystem 1618 may include one or more non-transitory memory devices, including volatile and non-volatile memory devices. As shown in FIG. 16, storage subsystem 1618 includes a system memory 1610 and a computer-readable storage media 1622. System memory 1610 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1600, such as during start-up, may typically be stored in the ROM. The RAM typically contains data and/or program modules that are presently being operated and executed by processing subsystem 1604. In some implementations, system memory 1610 may include multiple different types of memory, such as static random access memory (SRAM), dynamic random access memory (DRAM), and the like.

By way of example, and not limitation, as depicted in FIG. 16, system memory 1610 may load application programs 1612 that are being executed, which may include various applications such as Web browsers, mid-tier applications, relational database management systems (RDBMS), etc., program data 1614, and an operating system 1616. By way of example, operating system 1616 may include various versions of Microsoft Windows®, Apple Macintosh®, and/or Linux® operating systems, a variety of commercially-available UNIX® or UNIX-like operating systems (including without limitation the variety of GNU/Linux operating systems, the Oracle Linux®, Google Chrome® OS, and the like) and/or mobile operating systems such as iOS, Windows® Phone, Android® OS, and others.

Computer-readable storage media 1622 may store programming and data constructs that provide the functionality of some aspects. Computer-readable media 1622 may provide storage of computer-readable instructions, data structures, program modules, and other data for computer system 1600. Software (programs, code modules, instructions) that, when executed by processing subsystem 1604 provides the functionality described above, may be stored in storage subsystem 1618. By way of example, computer-readable storage media 1622 may include non-volatile memory such as a hard disk drive, a magnetic disk drive, an optical disk drive such as a CD ROM, digital video disc (DVD), a Blu-Ray® disk, or other optical media. Computer-readable storage media 1622 may include, but is not limited to, Zip® drives, flash memory cards, universal serial bus (USB) flash drives, secure digital (SD) cards, DVD disks, digital video tape, and the like. Computer-readable storage media 1622 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, dynamic random access memory (DRAM)-based SSDs, magnetoresistive RAM (MRAM) SSDs, and hybrid SSDs that use a combination of DRAM and flash memory based SSDs.

In certain aspects, storage subsystem 1618 may also include a computer-readable storage media reader 1620 that can further be connected to computer-readable storage media 1622. Reader 1620 may receive and be configured to read data from a memory device such as a disk, a flash drive, etc.

In certain aspects, computer system 1600 may support virtualization technologies, including but not limited to virtualization of processing and memory resources. For example, computer system 1600 may provide support for executing one or more virtual machines. In certain aspects, computer system 1600 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 1600. Accordingly, multiple operating systems may potentially be run concurrently by computer system 1600.

Communications subsystem 1624 provides an interface to other computer systems and networks. Communications subsystem 1624 serves as an interface for receiving data from and transmitting data to other systems from computer system 1600. For example, communications subsystem 1624 may enable computer system 1600 to establish a communication channel to one or more client devices via the Internet for receiving and sending information from and to the client devices. For example, the communications subsystem may be used to transmit a response to a user regarding the inquiry for a chatbot.

Communications subsystem 1624 may support both wired and/or wireless communication protocols. For example, in certain aspects, communications subsystem 1624 may include radio frequency (RF) transceiver components for accessing wireless voice and/or data networks (e.g., using cellular telephone technology, advanced data network technology, such as 3G, 4G or EDGE (enhanced data rates for global evolution), Wi-Fi (IEEE 802.XX family standards, or other mobile communication technologies, or any combination thereof), global positioning system (GPS) receiver components, and/or other components. In some aspects communications subsystem 1624 can provide wired network connectivity (e.g., Ethernet) in addition to or instead of a wireless interface.

Communications subsystem 1624 can receive and transmit data in various forms. For example, in some aspects, in addition to other forms, communications subsystem 1624 may receive input communications in the form of structured and/or unstructured data feeds 1626, event streams 1628, event updates 1630, and the like. For example, communications subsystem 1624 may be configured to receive (or send) data feeds 1626 in real-time from users of social media networks and/or other communication services such as Twitter® feeds, Facebook® updates, web feeds such as Rich Site Summary (RSS) feeds, and/or real-time updates from one or more third party information sources.

In certain aspects, communications subsystem 1624 may be configured to receive data in the form of continuous data streams, which may include event streams 1628 of real-time events and/or event updates 1630, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1624 may also be configured to communicate data from computer system 1600 to other computer systems or networks. The data may be communicated in various different forms such as structured and/or unstructured data feeds 1626, event streams 1628, event updates 1630, and the like to one or more databases that may be in communication with one or more streaming data source computers coupled to computer system 1600.

Computer system 1600 can be one of various types, including a handheld portable device (e.g., an iPhone® cellular phone, an iPad® computing tablet, a personal digital assistant (PDA)), a wearable device (e.g., a Meta Quest® head mounted display), a personal computer, a workstation, a mainframe, a kiosk, a server rack, or any other data processing system. Due to the ever-changing nature of computers and networks, the description of computer system 1600 depicted in FIG. 16 is intended only as a specific example. Many other configurations having more or fewer components than the system depicted in FIG. 16 are possible. Based on the disclosure and teachings provided herein, a person of ordinary skill in the art can appreciate other ways and/or methods to implement the various aspects.

Although specific aspects have been described, various modifications, alterations, alternative constructions, and equivalents are possible. Embodiments are not restricted to operation within certain specific data processing environments, but are free to operate within a plurality of data processing environments. Additionally, although certain aspects have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described aspects may be used individually or jointly.

Further, while certain aspects have been described using a particular combination of hardware and software, it should be recognized that other combinations of hardware and software are also possible. Certain aspects may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the aspects. However, aspects may be practiced without these specific details. For example, well-known circuits, processes, algorithms, structures, and techniques have been shown without unnecessary detail in order to avoid obscuring the aspects. This description provides example aspects only, and is not intended to limit the scope, applicability, or configuration of other aspects. Rather, the preceding description of the aspects can provide those skilled in the art with an enabling description for implementing various aspects. Various changes may be made in the function and arrangement of elements.

The specification and drawings are, accordingly, to be regarded in an illustrative rather than a restrictive sense. It can, however, be evident that additions, subtractions, deletions, and other modifications and changes may be made thereunto without departing from the broader spirit and scope as set forth in the claims. Thus, although specific aspects have been described, these are not intended to be limiting. Various modifications and equivalents are within the scope of the following claims.

What is claimed is:

1. A non-transitory computer-readable medium including instructions that when executed by one or more processors, cause the one or more processors to perform operations including:

receiving, at a filter service, a plurality of requests from a gateway service operating within a gateway tenancy of a cloud environment, wherein each request of the plurality of requests is either inbound to a customer tenancy or outbound from the customer tenancy of the cloud environment;

processing, by the filter service, each request of the plurality of requests, wherein processing the plurality of requests comprises one or more of (i) validating a schema of one or more requests of the plurality of requests, (ii) sampling one or more requests of the plurality of requests, and (iii) auditing one or more requests of the plurality of requests; and based at least in part on processing each request of the plurality of requests, (i) allowing passage of a first request of the plurality of requests to a corresponding target destination, (ii) denying passage of a second request of the plurality of requests to a corresponding target destination, (iii) modifying a third request of the plurality of requests, and allowing passage of the modified third request of the plurality of requests to a corresponding target destination.

2. The non-transitory computer-readable medium of claim 1, wherein modifying the third request of the plurality of requests comprises:

based at least in part on processing the third request of the plurality of requests, detecting an anomalous issue with the third request; and modifying the third request of the plurality of requests, to resolve the anomalous issue with the third request.

3. The non-transitory computer-readable medium of claim 2, wherein modifying the third request of the plurality of requests comprises:

identifying a section of the third request that is causing the anomalous issue; and modifying the third request, by removing or redacting at least the section of the third request.

4. The non-transitory computer-readable medium of claim 1, wherein denying passage of the second request of the plurality of requests to the corresponding target destination comprises:

based at least in part on processing each request of the plurality of requests, detecting an anomalous issue with the second request; and based at least in part on detecting the anomalous issue with the second request, denying passage of the second request of the plurality of requests to the corresponding target destination.

5. The non-transitory computer-readable medium of claim 1, wherein allowing passage of the first request of the plurality of requests to the corresponding target destination comprises:

based at least in part on processing each request of the plurality of requests, failing to detect any anomalous issue with the first request; and based at least in part on failing to detect any anomalous issue with the first request, allowing passage of the first request of the plurality of requests to the corresponding target destination.

6. The non-transitory computer-readable medium of claim 1, wherein validating the schema of one or more requests of the plurality of requests comprises:

verifying that a request adheres to predefined data structures and data formats.

7. The non-transitory computer-readable medium of claim 1, wherein auditing one or more requests of the plurality of requests comprises:

for at least one request of the plurality of requests, storing one or more of metadata associated with the least one request, an origin and destination of the least one request, a network path taken by the least one request, a timestamp of the least one request, one or more protocols associated with the least one request, and a status of schema validation of the least one request.

8. The non-transitory computer-readable medium of claim 1, wherein each request of the plurality of requests is received from the gateway service at a transport layer (layer 4).

9. The non-transitory computer-readable medium of claim 1, wherein each request of the plurality of requests is received from the gateway service at an application layer (layer 7) of a protocol stack.

10. The non-transitory computer-readable medium of claim 1, wherein any user or administrator of the customer tenancy does not have privilege to configure settings of the filter service.

11. A non-transitory computer-readable medium including instructions that when executed by one or more processors, cause the one or more processors to perform operations including:

receiving, at a filter service, a plurality of requests from a gateway service operating within a gateway tenancy of a cloud environment, wherein each request of the plurality of requests is either inbound to a customer tenancy or outbound from the customer tenancy of the cloud environment;

processing, by the filter service, each request of the plurality of requests, wherein processing the plurality of requests comprises one or more of (i) verifying whether one or more requests adhere to predefined data structures and data formats, and determining that the second request does not adhere to the predefined data structures and data formats, (ii) sampling one or more requests of the plurality of requests, and (iii) auditing one or more requests of the plurality of requests; and based at least in part on processing each request of the plurality of requests, (i) allowing passage of a first request of the plurality of requests to a corresponding target destination, and (ii) denying passage of a second request of the plurality of requests to a corresponding target destination, based at least in part on determining that the second request does not adhere to predefined data structures and data formats.

12. The non-transitory computer-readable medium of claim 11, wherein the operations further include:

based at least in part on processing each request of the plurality of requests, (i) modifying a third request of the plurality of requests, and (ii) allowing passage of the modified third request of the plurality of requests to a corresponding target destination.

13. A non-transitory computer-readable medium including instructions that when executed by one or more processors, cause the one or more processors to perform operations including:

receiving, at a filter service, a plurality of requests from a gateway service operating within a gateway tenancy of a cloud environment, wherein each request of the plurality of requests is either inbound to a customer tenancy or outbound from the customer tenancy of the cloud environment;

processing, by the filter service, each request of the plurality of requests, wherein processing the plurality of requests comprises one or more of (i) validating a schema of one or more requests of the plurality of requests, (ii) sampling one or more requests of the plurality of requests, and (iii) auditing one or more requests of the plurality of requests, wherein sampling one or more requests of the plurality of requests comprises:

randomly or pseudo-randomly selecting a subset of the plurality of requests; and storing the selected subset of the plurality of requests for offline analysis and anomaly detection; and based at least in part on processing each request of the plurality of requests, (i) allowing passage of a first request of the plurality of requests to a corresponding target destination, and (ii) denying passage of a second request of the plurality of requests to a corresponding target destination.

14. The non-transitory computer-readable medium of claim 1, wherein:

the plurality of requests is a first plurality of requests;

the first plurality of requests is received from a compute instance within the customer tenancy and is destined for a first resource within or outside the cloud environment;

the filter service is a first filter service; and the operations further include:

receiving, at a second filter service operating within the gateway tenancy of the cloud environment, a second plurality of requests from the gateway service operating within the gateway tenancy, wherein each request of the second plurality of requests is outbound from the compute instance within the customer tenancy and is destined for a second resource within or outside the cloud environment;

processing, by the second filter service, each request of the second plurality of requests, wherein processing the second plurality of requests comprises one or more of (i) validating a schema of one or more requests of the second plurality of requests, (ii) sampling one or more requests of the second plurality of requests, and (iii) auditing one or more requests of the second plurality of requests; and based at least in part on processing each request of the second plurality of requests, (i) allowing passage of a fourth request of the second plurality of requests, without modifying the fourth request, to the second cloud resource, (ii) denying passage of a fifth request of the second plurality of requests to the second cloud resource, and (iii) modifying a sixth request of the second plurality of requests, and allowing passage of the modified sixth request of the second plurality of requests to the second cloud resource.

15. The non-transitory computer-readable medium of claim 14, wherein:

a first schema validation implemented by the first filter service is different from a second schema validation implemented by the second filter service, such that a first data field allowed under the first schema validation is disallowed under the second schema validation.

16. A non-transitory computer-readable medium including instructions that when executed by one or more processors, cause the one or more processors to perform operations including:

receiving, at a filter service, a plurality of requests from a gateway service operating within a gateway tenancy of a cloud environment, wherein each request of the plurality of requests is either inbound to a customer tenancy or outbound from the customer tenancy of the cloud environment;

processing, by the filter service, each request of the plurality of requests, wherein processing the plurality of requests comprises one or more of (i) validating a schema of one or more requests of the plurality of requests, (ii) sampling one or more requests of the plurality of requests, and (iii) auditing one or more requests of the plurality of requests, wherein processing, by the filter service, each request of the plurality of requests further comprises:

classifying and labelling a request of the plurality of requests, by adding metadata to the request, the metadata including a classification and/or a label of the request; and utilizing the metadata in further processing the request; and based at least in part on processing each request of the plurality of requests, (i) allowing passage of a first request of the plurality of requests to a corresponding target destination, and (ii) denying passage of a second request of the plurality of requests to a corresponding target destination.

17. A method comprising:

receiving, at a filter service, a plurality of requests from a gateway service operating within a gateway tenancy of a cloud environment, wherein each request of the plurality of requests is either inbound to a customer tenancy or outbound from the customer tenancy of the cloud environment;

processing, by the filter service, each request of the plurality of requests, wherein processing the plurality of requests comprises one or more of (i) validating a schema of one or more requests of the plurality of requests, (ii) sampling one or more requests of the plurality of requests, and (iii) auditing one or more requests of the plurality of requests; and based at least in part on processing each request of the plurality of requests, (i) allowing passage of a first request of the plurality of requests to a corresponding target destination, (ii) denying passage of a second request of the plurality of requests to a corresponding target destination, (iii) modifying a third request of the plurality of requests, and allowing passage of the modified third request of the plurality of requests to a corresponding target destination.

18. The method of claim 17, wherein each request of the plurality of requests is received from the gateway service at an application layer (layer 7) of a protocol stack.

19. A system comprising:

one or more processors; and one or more non-transitory computer-readable media storing instructions, which, when executed by the system, cause the system to perform a set of actions including:

receiving, at a filter service, a plurality of requests from a gateway service operating within a gateway tenancy of a cloud environment, wherein each request of the plurality of requests is either inbound to a customer tenancy or outbound from the customer tenancy of the cloud environment;

processing, by the filter service, each request of the plurality of requests, wherein processing the plurality of requests comprises one or more of (i) validating a schema of one or more requests of the plurality of requests, (ii) sampling one or more requests of the plurality of requests, and (iii) auditing one or more requests of the plurality of requests, wherein sampling one or more requests of the plurality of requests comprises (i) randomly or pseudo-randomly selecting a subset of the plurality of requests, and (ii) storing the selected subset of the plurality of requests for offline analysis and anomaly detection; and based at least in part on processing each request of the plurality of requests, (i) allowing passage of a first request of the plurality of requests to a corresponding target destination, and (ii) denying passage of a second request of the plurality of requests to a corresponding target destination.

20. The system of claim 19, wherein the actions further include:

based at least in part on processing each request of the plurality of requests, (i) modifying a third request of the plurality of requests, and (ii) allowing passage of the modified third request of the plurality of requests to a corresponding target destination.

* * * * *